Aug. 18, 1953 — L. CASPER — 2,649,065
EMBROIDERY MACHINE AND CODED-TAPE CONTROL MEANS
Filed Dec. 7, 1948 — 22 Sheets-Sheet 1

INVENTOR.
L. CASPER
BY
M. R. Marsh
ATTORNEY

Aug. 18, 1953  L. CASPER  2,649,065
EMBROIDERY MACHINE AND CODED-TAPE CONTROL MEANS
Filed Dec. 7, 1948  22 Sheets-Sheet 6

INVENTOR.
L. CASPER
BY
M. R. Marsh
ATTORNEY

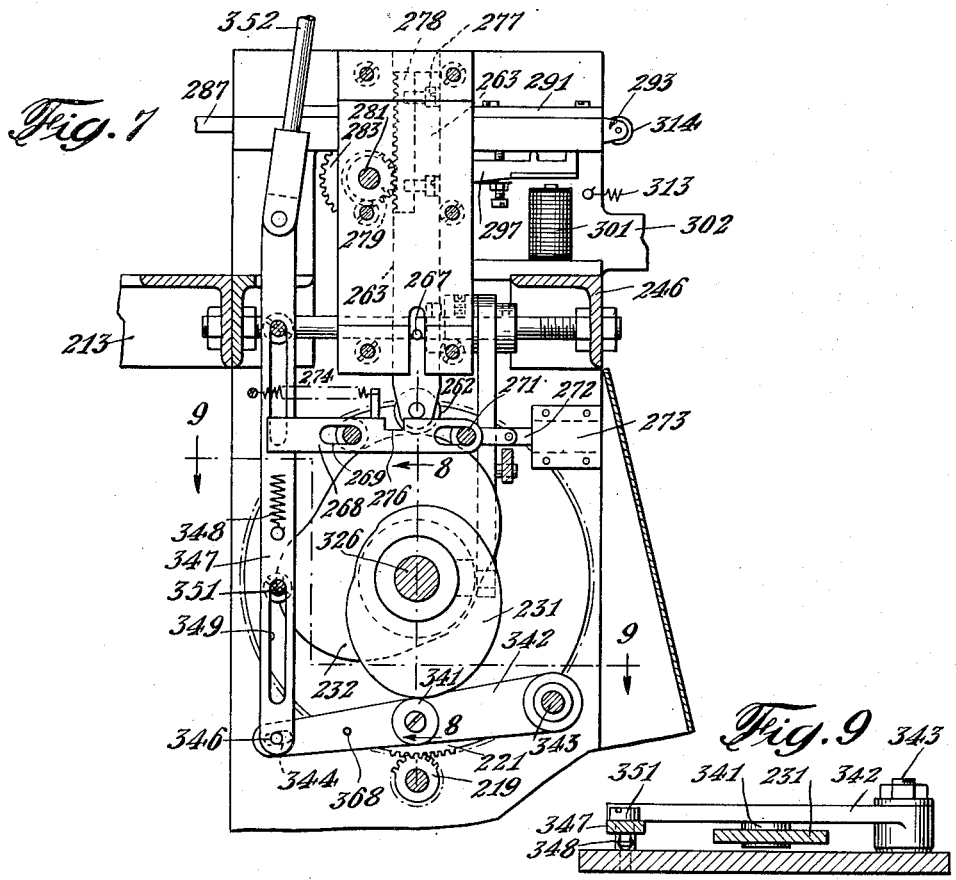
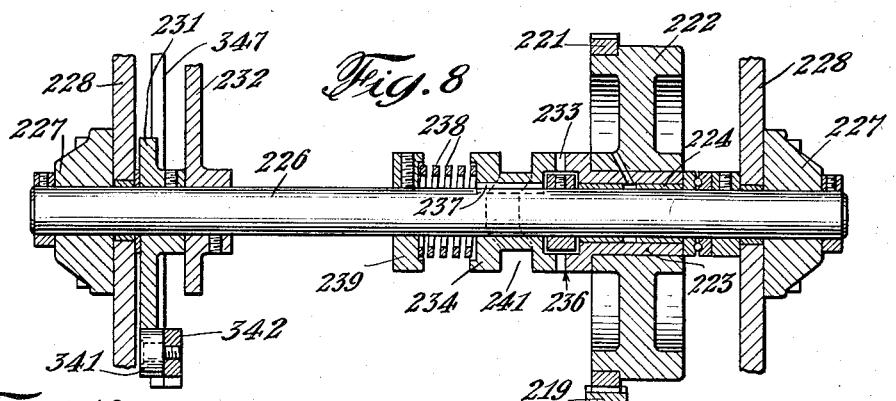
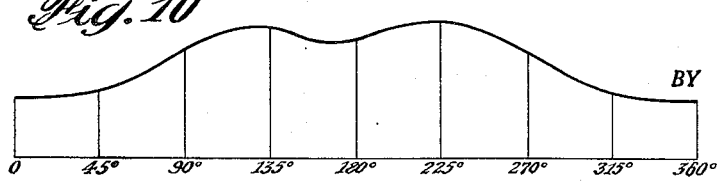

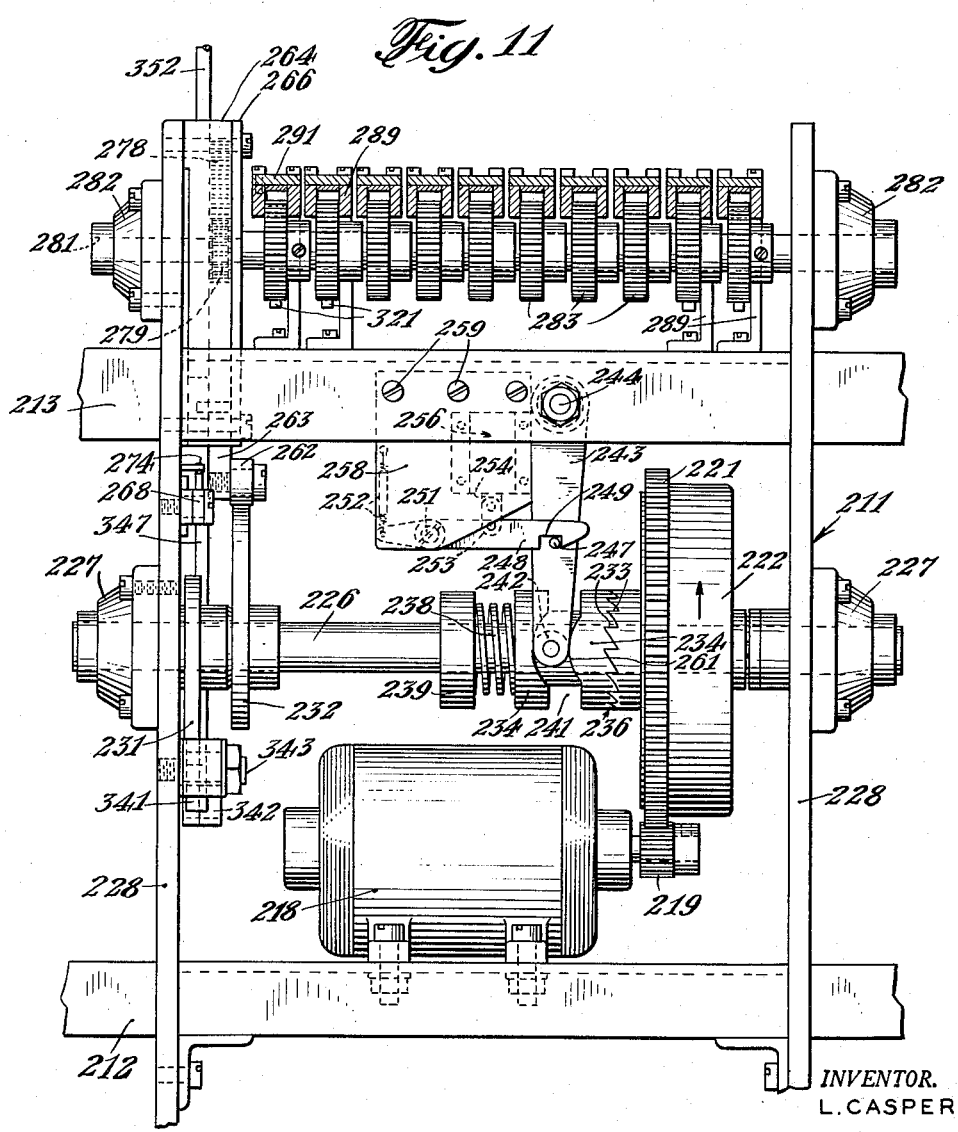

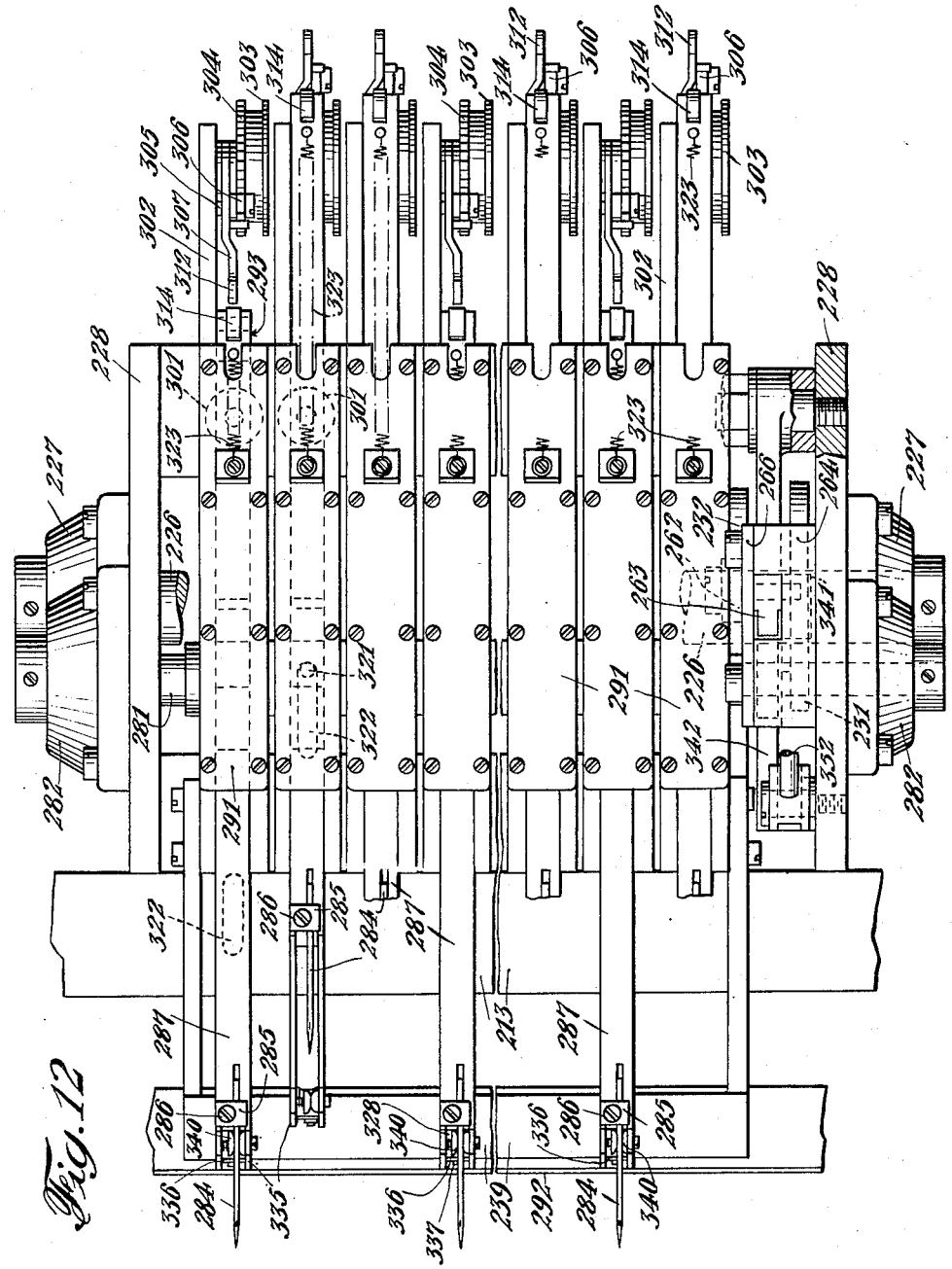

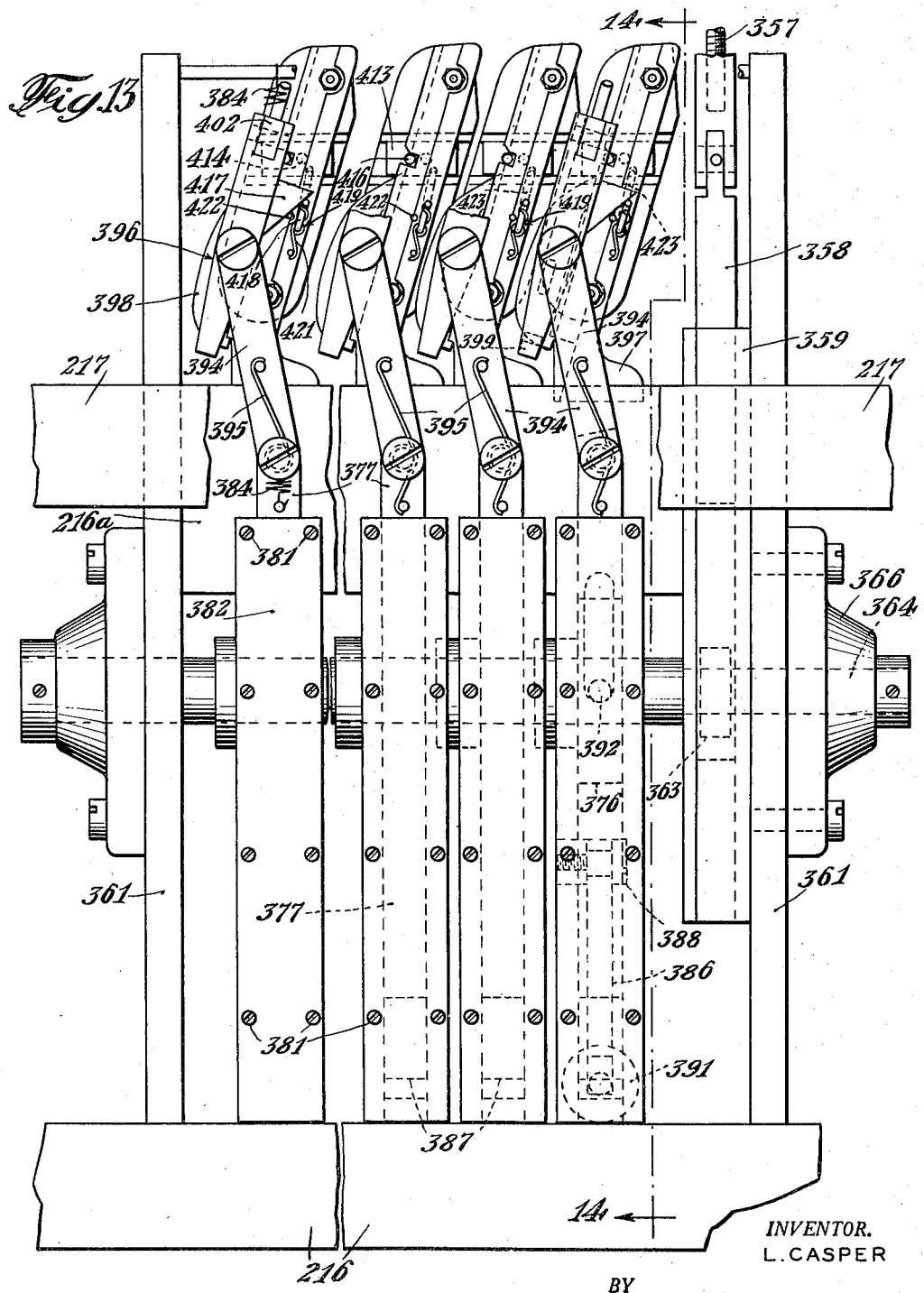

Aug. 18, 1953  L. CASPER  2,649,065
EMBROIDERY MACHINE AND CODED-TAPE CONTROL MEANS
Filed Dec. 7, 1948  22 Sheets-Sheet 11
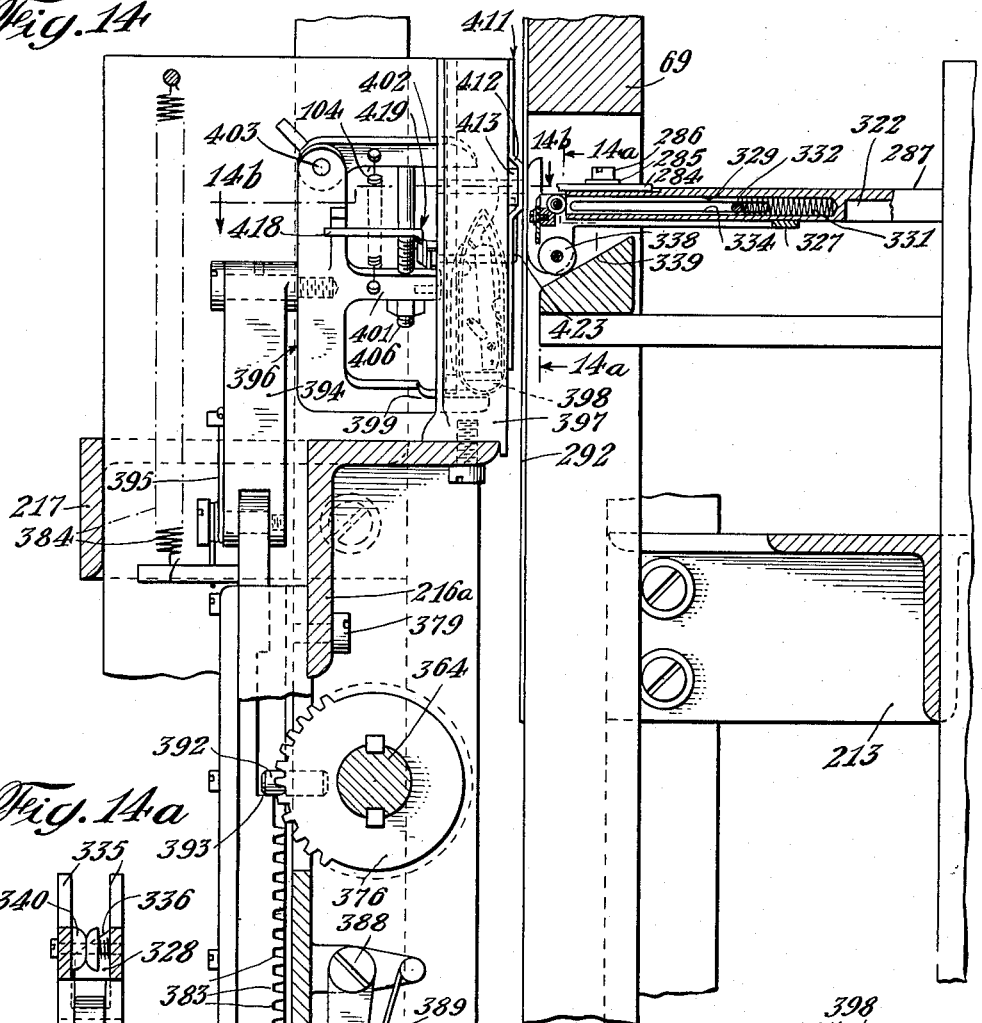
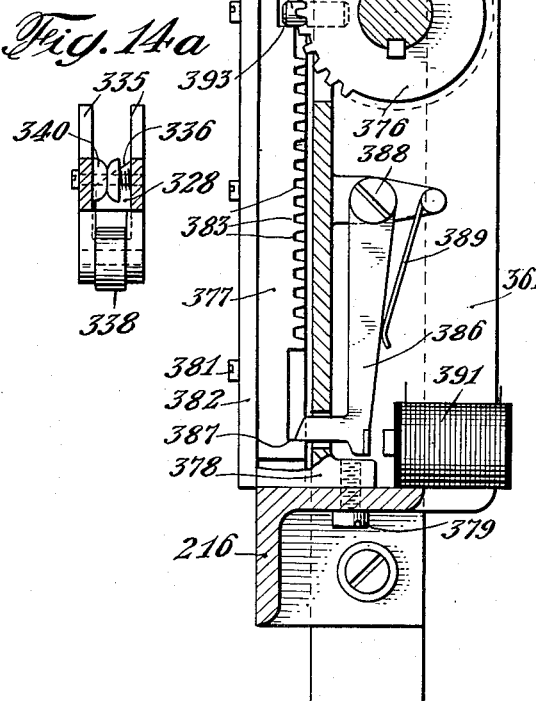
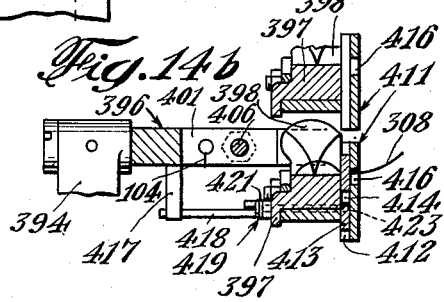
INVENTOR.
L. CASPER
BY
ATTORNEY

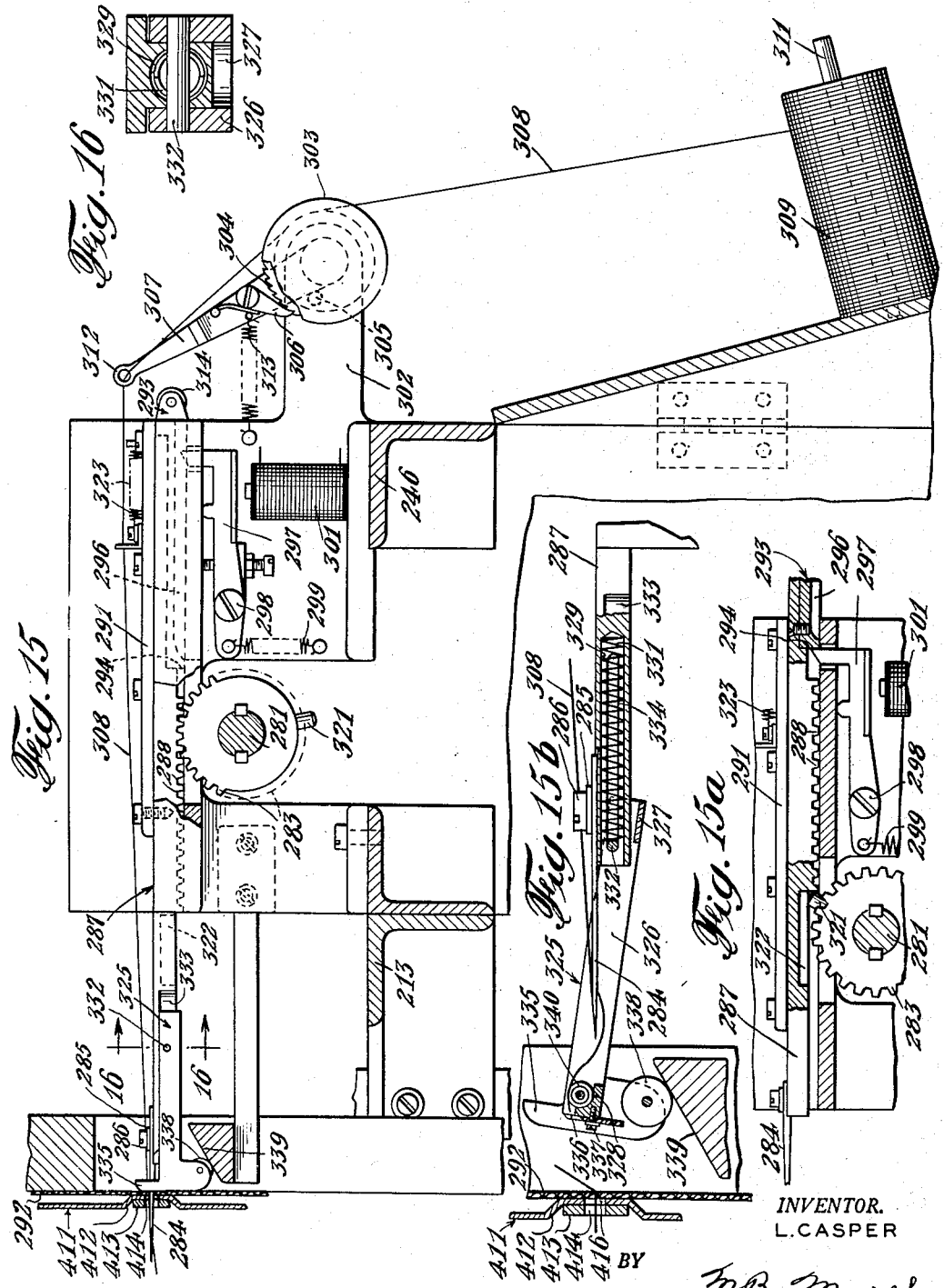

Aug. 18, 1953   L. CASPER   2,649,065
EMBROIDERY MACHINE AND CODED-TAPE CONTROL MEANS
Filed Dec. 7, 1948   22 Sheets-Sheet 13
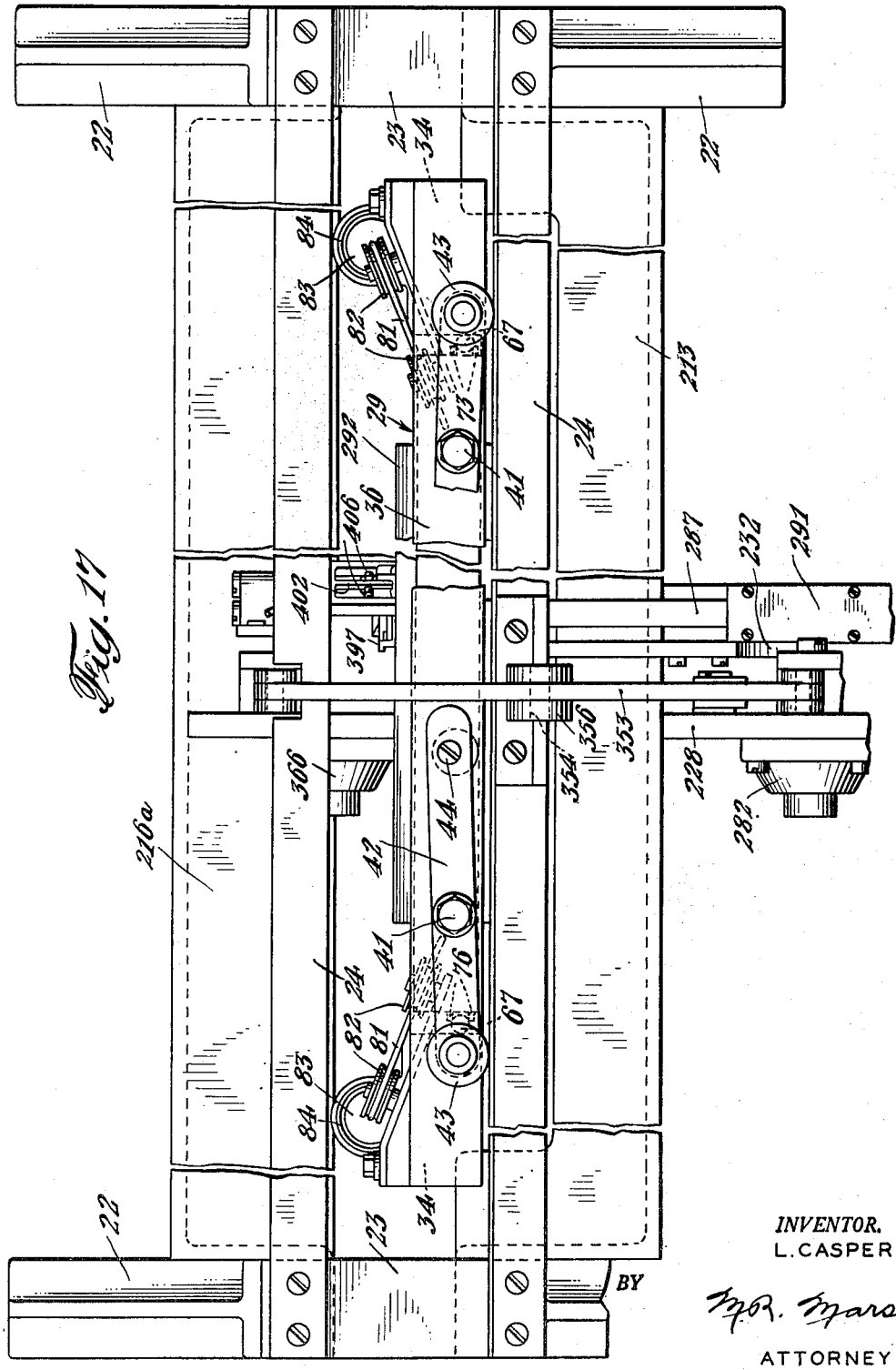
INVENTOR.
L. CASPER
BY
ATTORNEY Aug. 18, 1953 L. CASPER 2,649,065
EMBROIDERY MACHINE AND CODED-TAPE CONTROL MEANS
Filed Dec. 7, 1948 22 Sheets-Sheet 14

INVENTOR.
L. CASPER
BY
ATTORNEY

Aug. 18, 1953          L. CASPER          2,649,065
EMBROIDERY MACHINE AND CODED-TAPE CONTROL MEANS
Filed Dec. 7, 1948          22 Sheets-Sheet 15
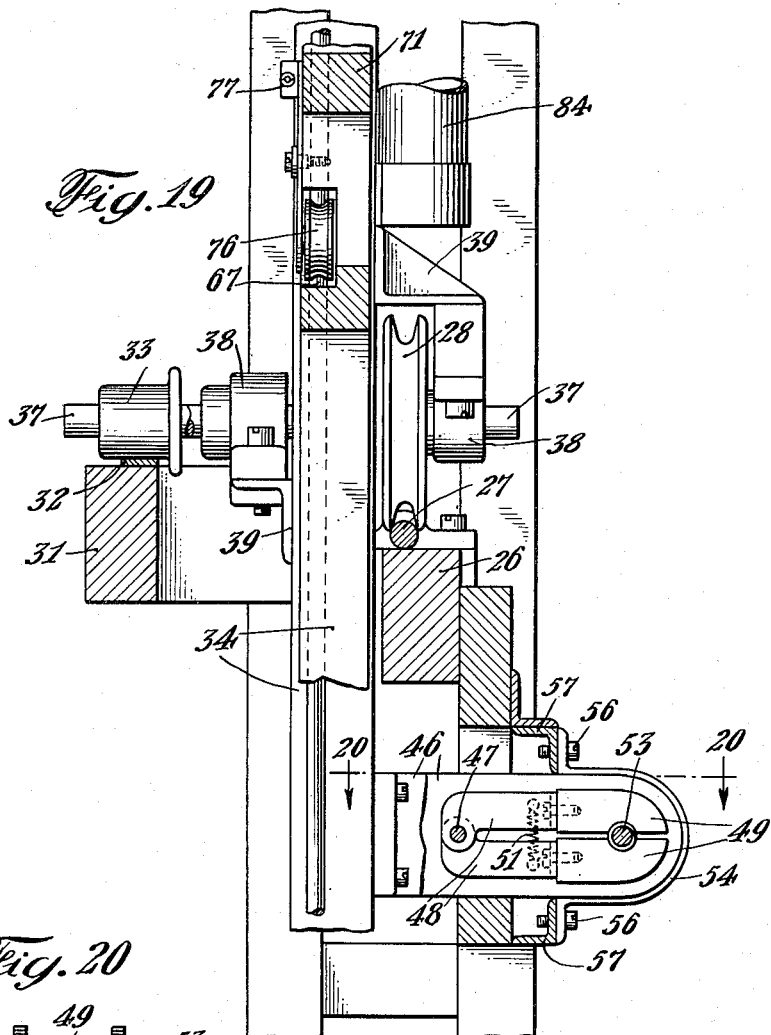
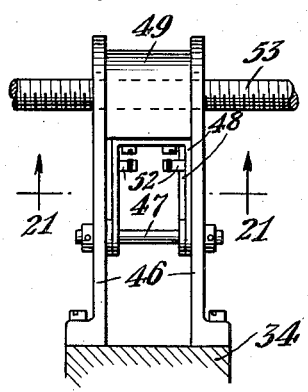
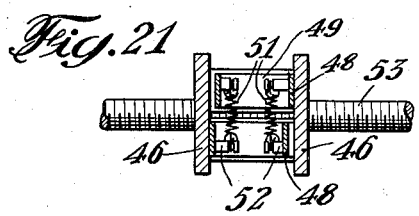
INVENTOR.
L. CASPER
BY
*M. R. Marsh*
ATTORNEY

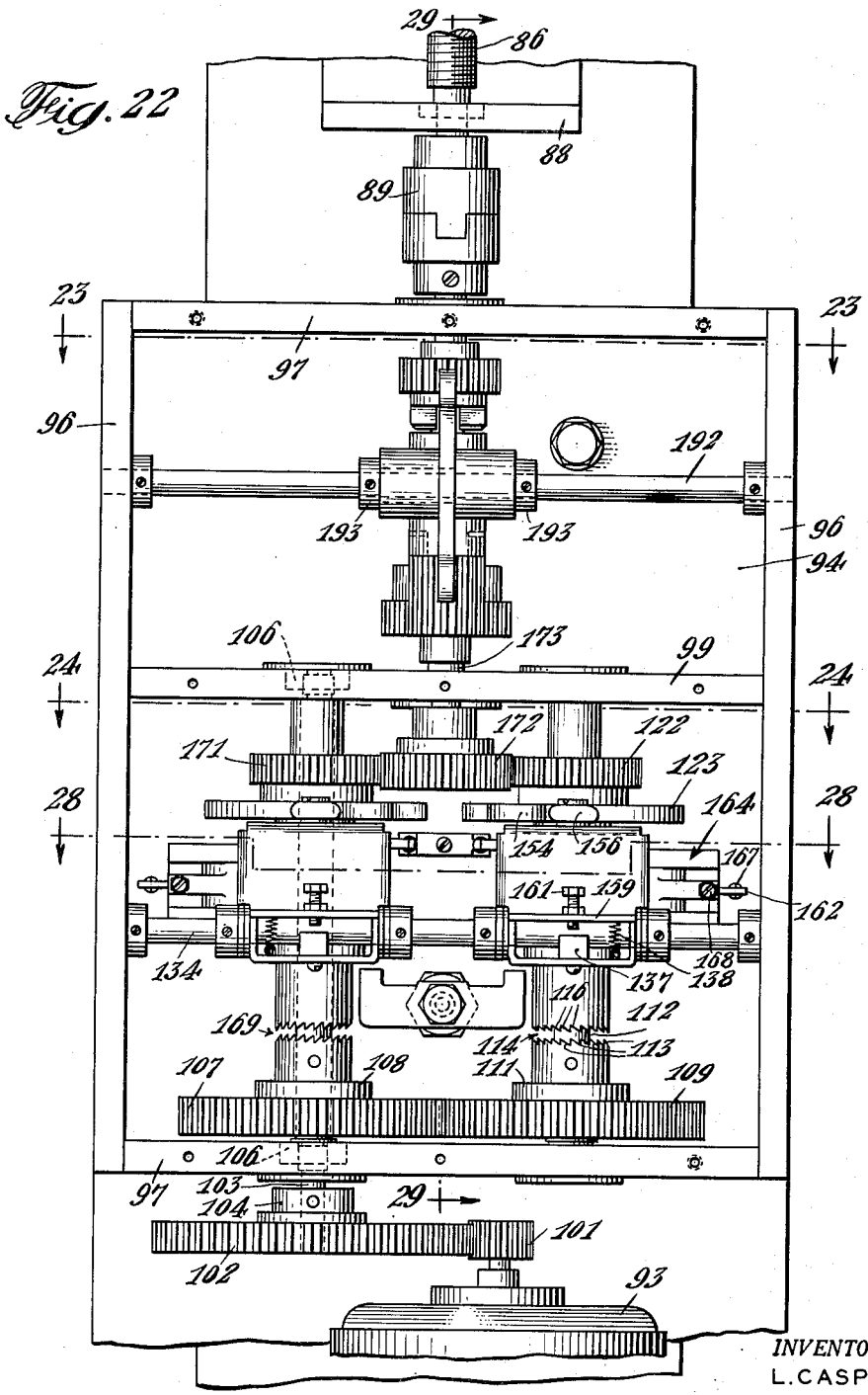

Aug. 18, 1953　　　　　L. CASPER　　　　　2,649,065
EMBROIDERY MACHINE AND CODED-TAPE CONTROL MEANS
Filed Dec. 7, 1948　　　　　　　　　　　　22 Sheets-Sheet 17

INVENTOR.
L. CASPER
BY
M. R. Marsh
ATTORNEY

Aug. 18, 1953     L. CASPER     2,649,065
EMBROIDERY MACHINE AND CODED-TAPE CONTROL MEANS
Filed Dec. 7, 1948     22 Sheets-Sheet 18

INVENTOR.
L. CASPER
BY
*M. R. Marsh*
ATTORNEY

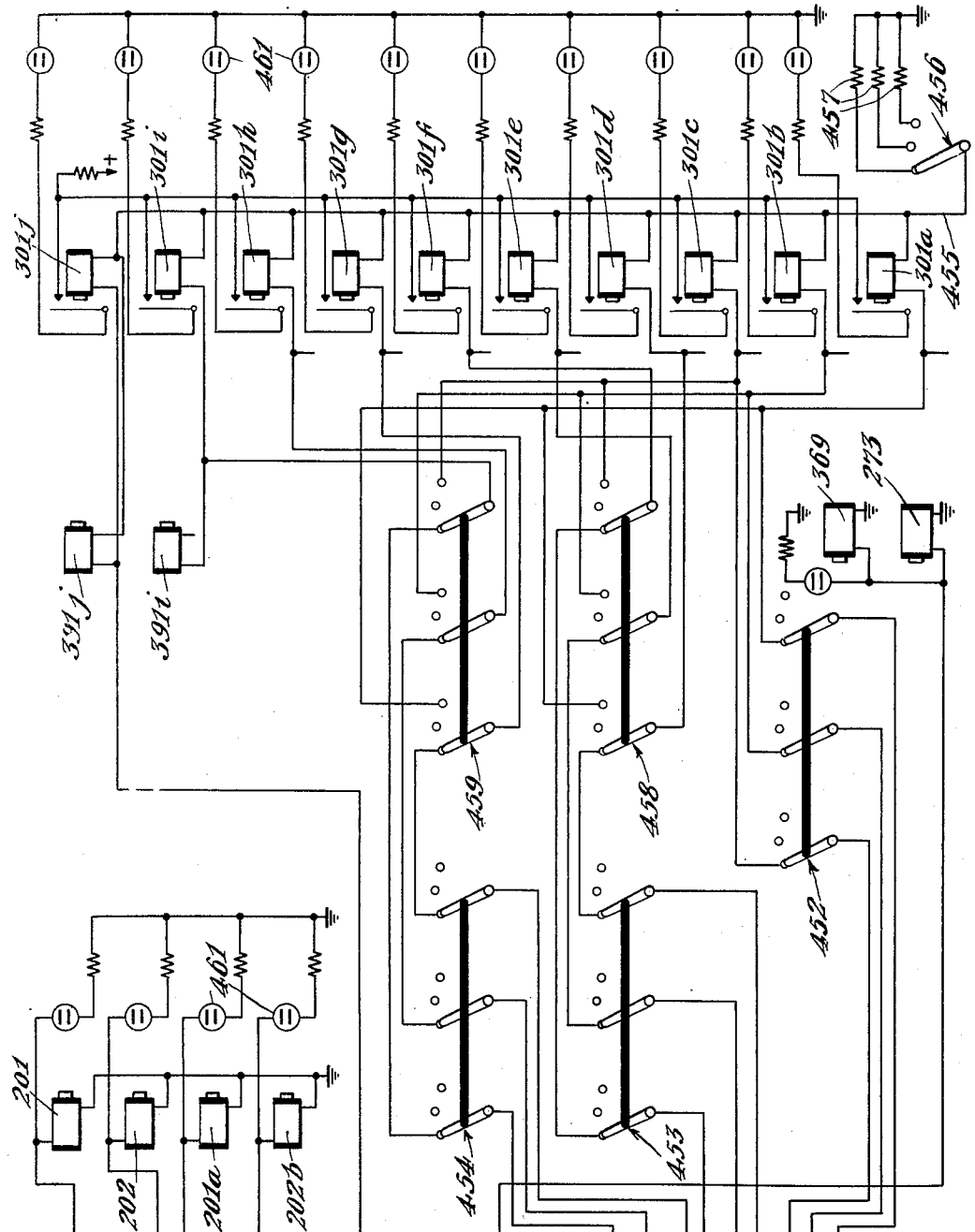

Aug. 18, 1953             L. CASPER             2,649,065
EMBROIDERY MACHINE AND CODED-TAPE CONTROL MEANS
Filed Dec. 7, 1948             22 Sheets-Sheet 20
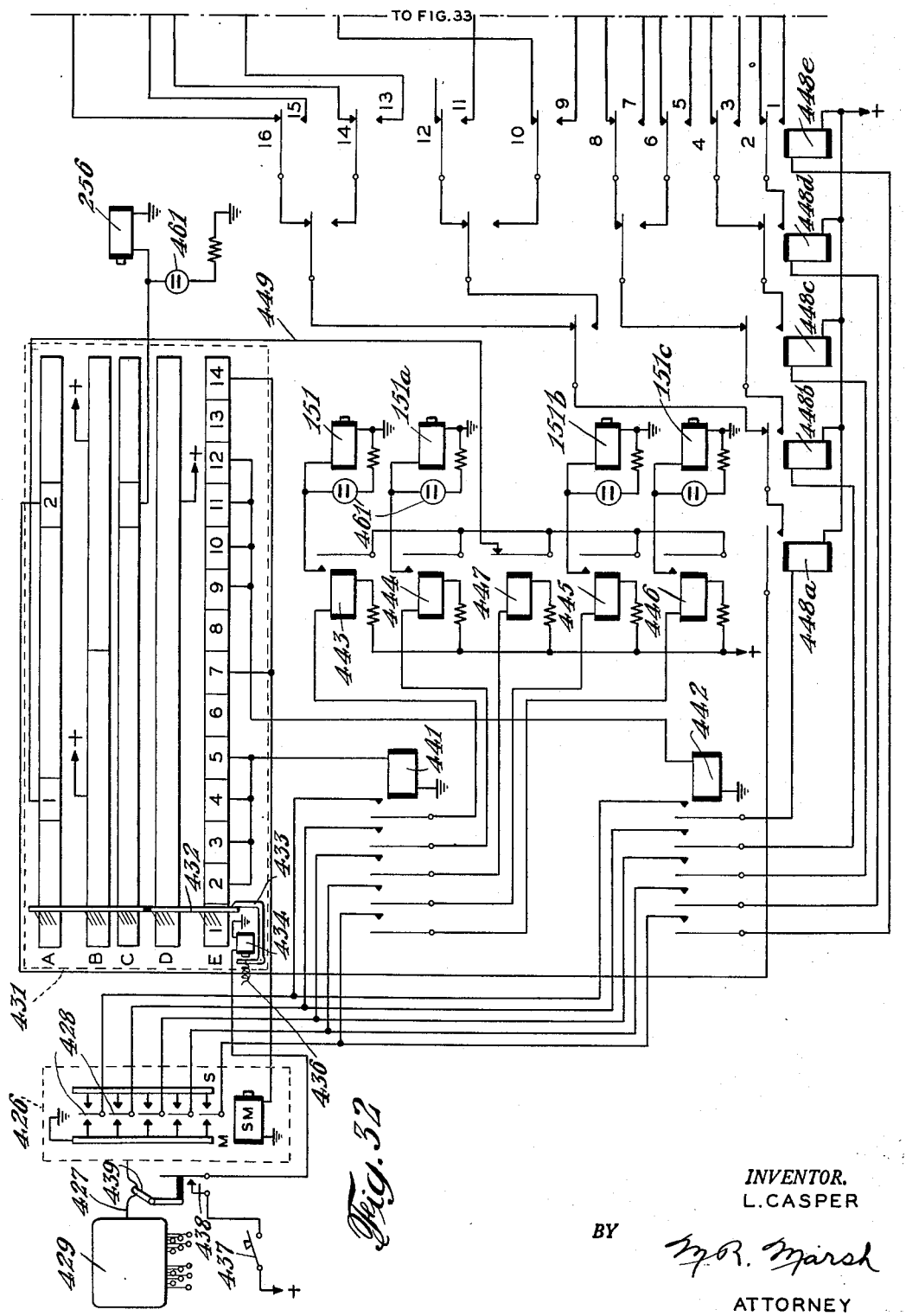
*INVENTOR.*
L. CASPER
BY
ATTORNEY

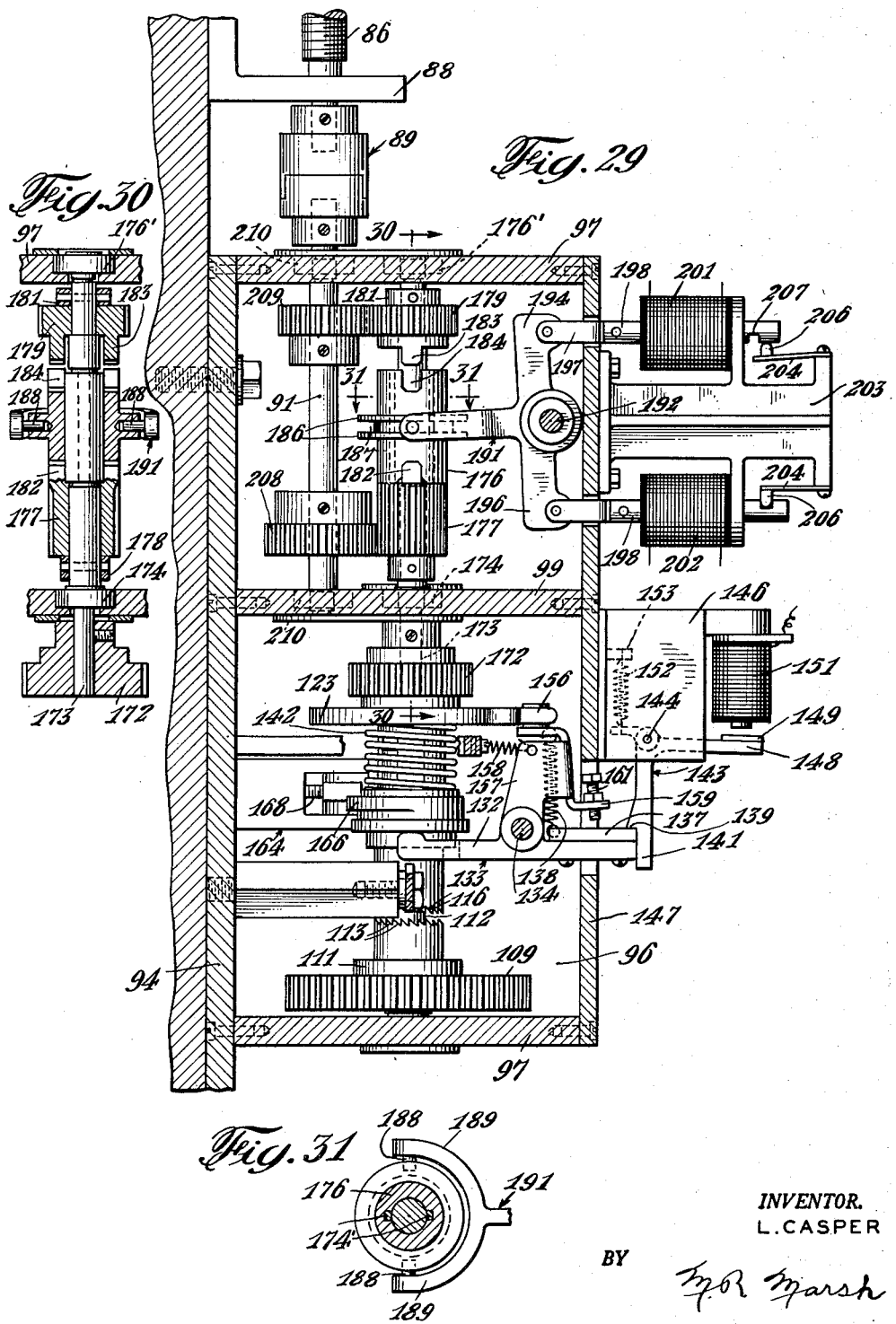

Aug. 18, 1953  L. CASPER  2,649,065
EMBROIDERY MACHINE AND CODED-TAPE CONTROL MEANS
Filed Dec. 7, 1948  22 Sheets-Sheet 22
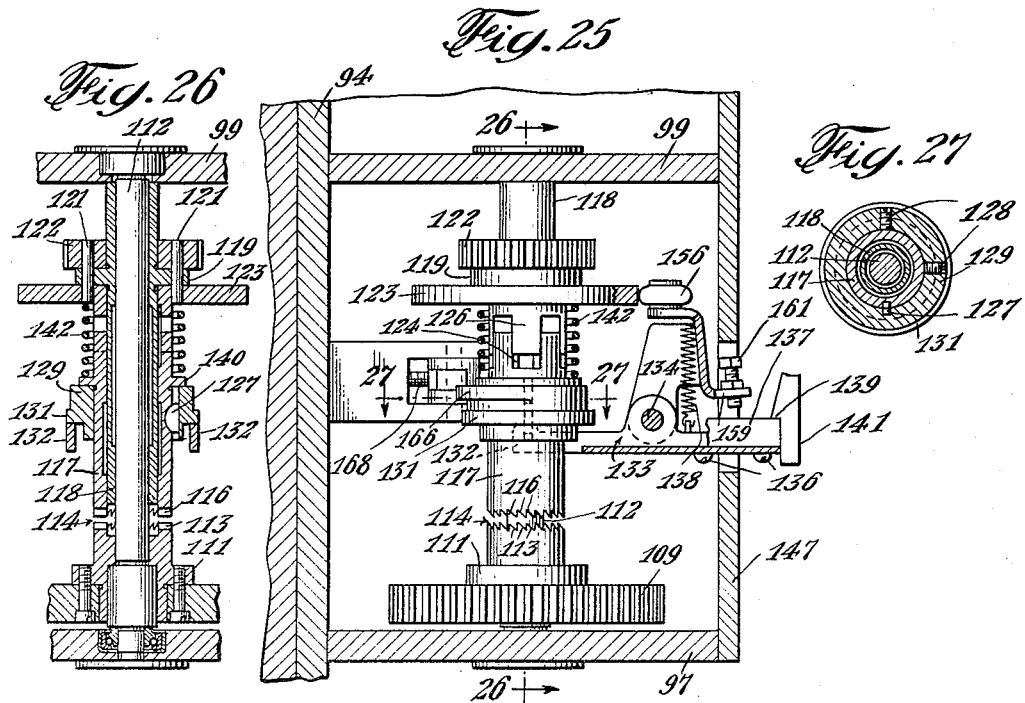
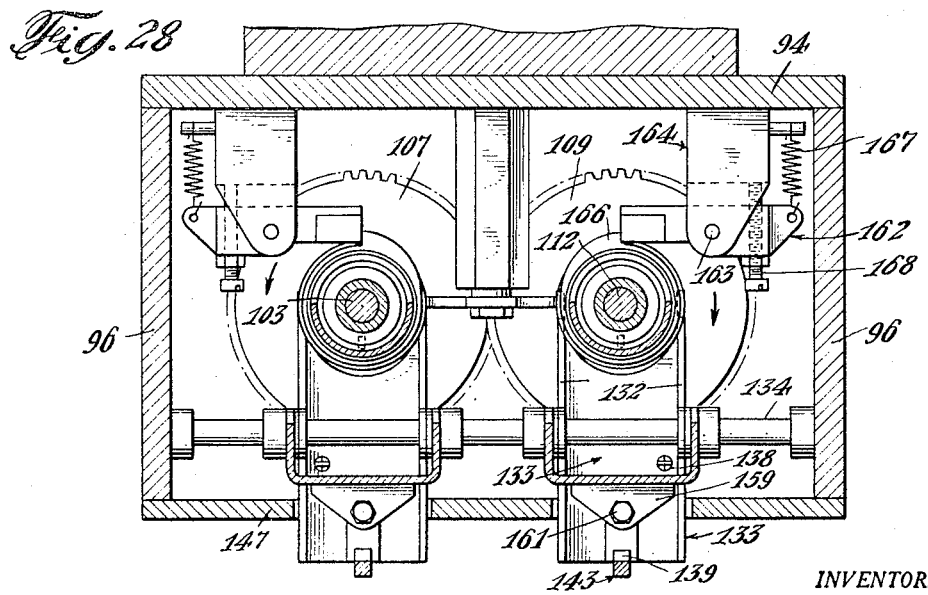
INVENTOR.
L. CASPER
BY
M. R. Marsh
ATTORNEY Patented Aug. 18, 1953

2,649,065

UNITED STATES PATENT OFFICE 2,649,065

EMBROIDERY MACHINE AND CODED-TAPE CONTROL MEANS

Louis Casper, Richmond Hill, N. Y., assignor to Electrotext Corp., New York, N. Y., a corporation of New York Application December 7, 1948, Serial No. 63,879

18 Claims. (Cl. 112—84)

The present invention relates primarily to textile machines, and more particularly to textile machines and controls therefor for weaving a fabric and/or working upon a fabric to produce embroideries, tapestries, needlepoints, and like pieces.

Present day machines of the above general type, for example, those employed to produce an embroidery or an embroidered design upon a piece of fabric, have a number of disadvantages. Some of these disadvantages are that the machines for producing these works are huge and cumbersome, expensive, relatively slow in operation, and require that the machine be stopped to enable a manual changing or rethreading of the needle when the color of the yarn or thread being employed, in the case of a multicolored design, is to be changed. Such machines all have the disadvantage that the design of the embroidery or the movement of the embroidery needle relative to the fabric worked upon is controlled locally, as for example, through a pantagraph arrangement, by the machine attendant.

With the above drawbacks in mind, generally, it is the primary object of the present invention to provide a textile machine of the above general type which has none of the above named disadvantages and which performs and operates in a superior and improved manner.

A more specific object of the invention is to provide a textile machine, such as an embroidering machine or a loom for weaving the fabric, and a control mechanism therefor which is physically separated from the machine and is only associated therewith through the medium of electrical control circuits.

Another object of the invention is to provide a control mechanism or unit for controlling simultaneously a plurality of machines of the above type such as embroidering machines.

Still another object of the invention is to provide a control mechanism having the above features which in turn is controlled by a perforated tape, the control mechanism in the case of an embroidering machine determining the points or locations of a fabric to be embroidered and in which one of a plurality of embroidery needles does the embroidering so that with different colors of the yarn or thread in the needles a multiple color embroidery is automatically produced.

More specifically, an object of the invention resides in a control mechanism for automatically selecting for embroidering operation one or more of a plurality of embroidery needles, operating the same simultaneously when more than one is selected, and moving a fabric carrying frame in conjunction therewith so as to produce the desired embroidery pattern.

Another object of the invention resides in the control mechanism for an embroidery machine to enable a change of color of the thread or yarn used for embroidery without the necessity of stopping the machine to rethread the embroidery needle. In other words, the control mechanism enables the color of the embroidery yarn or thread to be changed without interrupting the operation of the machine itself.

Still another object of the invention is to provide a textile machine for embroidering which operates to automatically cut the embroidery yarn adjacent the fabric worked upon when terminating the use of one color of yarn and beginning the use of a differently colored yarn.

Another object of the invention is to provide a control mechanism operative in the above specified manner when changing from one color of yarn to another and also when changing from one working point on the fabric to another.

Another object of the invention resides in the provision of a multiple needle embroidery machine and a control unit therefor which enables the use of any one of the needles at a time or the simultaneous use of a plurality of needles whereby a plurality of similar designs may be produced simultaneously.

In connection with the above, a further object of the invention resides in the provision of a control mechanism which enables a plurality of common designs to be worked simultaneously with differently colored yarns or threads.

Still another object of the invention is to provide a control mechanism which is applicable to an embroidery machine in accordance with the above and which is equally well applicable to the control of automatic looms of the Jacquard type.

Still another object of the invention is to provide a textile machine and control therefor having all the above advantages and features, which is relatively light and extremely fast in operation.

The above and further objects of the invention will be more apparent from the following detailed description of the preferred embodiment of the textile machine for embroidering and with the control unit and operating mechanism therefor, wherein reference is made to the accompanying drawings, in the latter of which:

Fig. 7 is a view of some of the needle operating mechanism in an operated position;

Fig. 8 is a sectional view of the drive shaft for the needle and shuttle operating mechanism taken substantially on line 8—8 of Fig. 7;

Fig. 9 is a sectional view of the needle operating cam taken substantially on line 9—9 of Fig. 7;

Fig. 10 is a view showing a development of the needle cam;

Fig. 11 is a front view of the structure and elements of the needle operating mechanism and the drive shaft clutch;

Fig. 12 is a plan view of the structure and elements shown in Fig. 11;

Fig. 13 is an enlarged elevational view of the shuttle operating mechanism;

Fig. 14 is a sectional view taken on line 14—14 of Fig. 13;

Fig. 14a is a sectional view taken on line 14a—14a of Fig. 14;

Fig. 14b is a sectional view taken on line 14b—14b of Fig. 14;

Fig. 15 is a fragmentary sectional view of the needle operating mechanism and the needle thread or yarn cutting arrangement;

Fig. 15a is a view showing a needle and needle bar in a retracted position;

Fig. 15b is a view showing the needle thread cutting mechanism;

Fig. 16 is a sectional view taken on line 16—16 of Fig. 15 of a modified form of the thread or yarn cutting unit;

Fig. 17 is a fragmentary detail plan view of the frame and guides thereof;

Fig. 19 is a sectional view taken substantially on line 19—19 of Fig. 18;

Fig. 20 is a sectional view taken substantially on line 20—20 of Fig. 19;

Fig. 21 is a sectional view taken substantially on line 21—21 of Fig. 20;

Fig. 22 is a front elevational view of a part of the frame operating mechanism with the cover removed;

Fig. 25 is a sectional view taken substantially on line 25—25 of Fig. 24;

Fig. 26 is a sectional view taken substantially on line 26—26 of Fig. 25;

Fig. 27 is a sectional view taken substantially on line 27—27 of Fig. 25;

Fig. 28 is a sectional view taken substantially on line 28—28 of Fig. 22;

Fig. 29 is a sectional view taken substantially on line 29—29 of Fig. 22;

Fig. 30 is a sectional view taken substantially on line 30—30 of Fig. 29;

Fig. 31 is a sectional view taken on line 31—31 of Fig. 29;

Figs. 32 and 33 are circuit diagrams showing the control circuits and electrical units of the control unit.

*General description*

Figure 1:
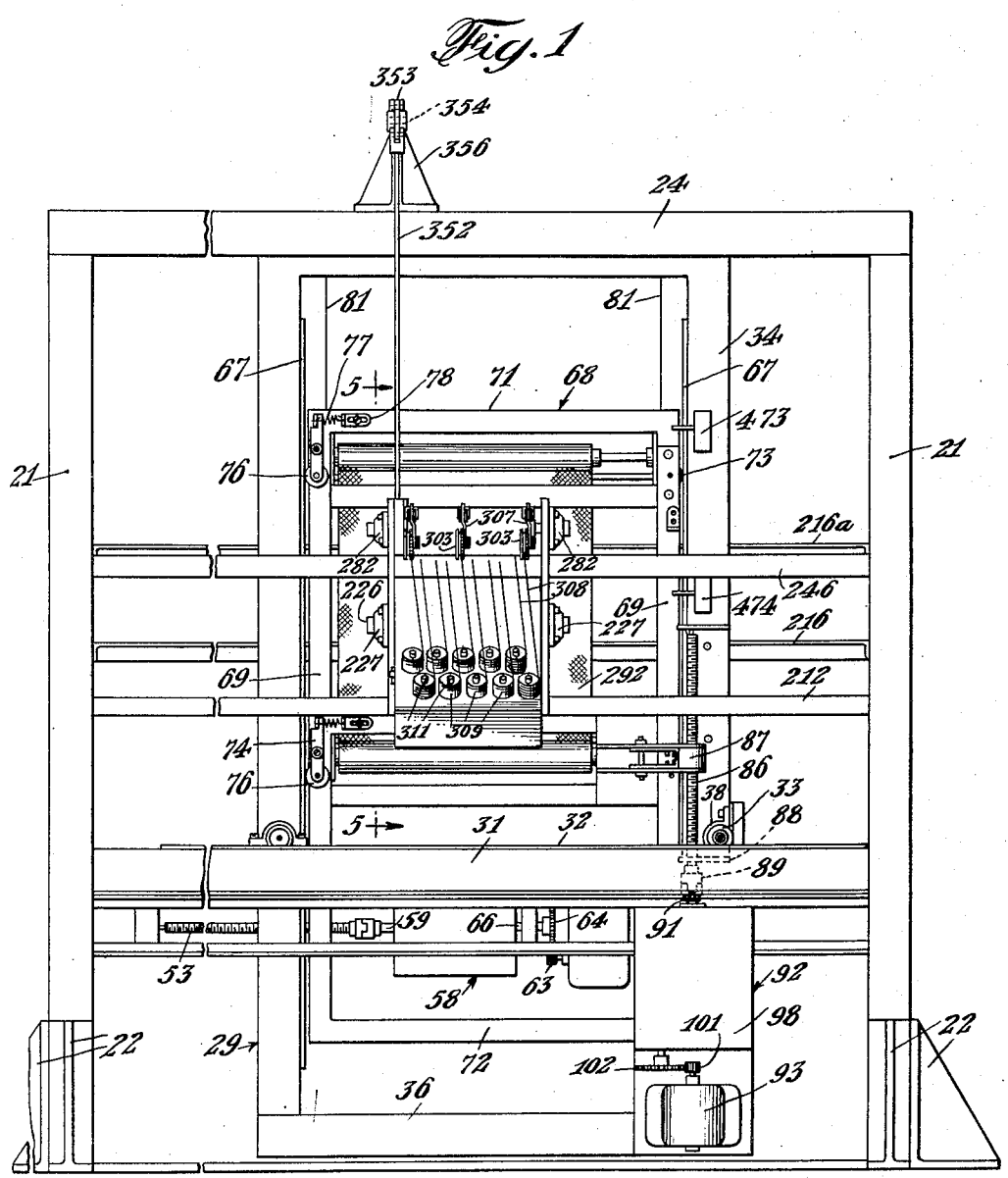
Fig. 1 is a front elevational view of the textile machine of the present invention.

The preferred embodiment of the invention which is shown in the drawings and described in detail hereinafter includes a machine referred to as a loom for embroidering upon a fabric or workpiece. The invention, however, as will be apparent, is not limited to only an embroidery machine but various phases thereof, particularly the control unit, for example, are readily adaptable for the control of various other types of textile machines such as a loom for weaving.

The loom of the present invention has a stationary structural framework of suitable rigidity which includes various guides and supports for the several elements and mechanisms. Included in the structural members are horizontal guides for supporting and guiding a horizontally movable frame. The horizontally movable frame has in turn vertical guides for supporting and guiding a smaller vertically movable frame. The power supplying mechanism and control therefor for moving the horizontally movable frame is fully supported on the structural framework while that of the vertical frame is mounted on and movable with the horizontally movable frame. The two frames are moved by power supplied from individual electric motors through suitable clutch mechanisms and lead screws. The clutch mechanisms are so arranged that for certain conditions the frames may be moved different distances on each cycle of operation. For example, the frames may move one-thirty-second or one-sixteenth of an inch in a cycle of operation, as governed selectively by the control unit.

The inner vertically movable frame carries the work-piece or fabric to be embroidered and in the arrangement shown the fabric is supplied from one roll and taken up on another after being worked upon. The size of the inner frame is governed by the size of the embroidery desired and, for example, may be arranged to embroider a design fifteen inches in the vertical dimension and eighteen inches in the horizontal. Obviously, a smaller or a larger frame may be employed depending upon the type of work to be produced.

Located on the front of the machine and supported from the main framework is a so-called needle unit containing a set of embroidery needles. There may be any reasonable number of embroidery needles and in the preferred embodiment there are ten, and each may carry a different colored thread or yarn to work into the embroidery. On the opposite side of the machine and in operative relation with the needles is a shuttle unit with a corresponding number of shuttles which carry the thread or yarn for locking the embroidery stitches. Through the movement of the horizontal and vertical movable frames any elementary area of the workpiece can be positioned opposite any one of the needles so that any area can be embroidered with any of the threads carried thereby.

In normal operation of the loom only one of the needles is operated at a time as would be the case when the entire exposed area of the workpiece is to include a single design. However, in accordance with the invention, the needle control mechanism is so arranged that more than one needle can be operated at a time to produce duplicate designs on the workpiece simultaneously. In such cases of producing duplicate designs the number of different colors for a different design is more limited and these duplicate designs may be produced in the same or different color schemes.

As stated in the objects of the invention, the control unit for the loom is physically separated therefrom and the only connection between the control unit and the loom is through the medium of electrical conductors. This is highly advantageous in that the more delicate control unit can be located by itself in a dust-free location, and in addition is capable of controlling a plurality of looms simultaneously. The control unit functions to select any one or more of the plurality of needles for operation in each cycle and also determines whether the workpiece moves horizontally to the left or the right, or vertically up or down, or in a direction resulting from a combination of the vertical and horizontal movements for a cycle of operation. The control unit includes a rotatable distributor having a number of segments for timing and controlling the transmission from a tape transmitter of permuted groups of controlling impulses. During each cycle of operation two code groups of impulses are normally transmitted, one group to determine the movements of the frames and the other group to determine the needle and thereby the color of yarn stitched. The tape transmitter is in turn controlled by perforated tape much like that used in telegraph systems to store messages wherein each transverse section thereof is perforated to represent a character. As in telegraph practice, the tape may be prepared from a keyboard which is operated manually in accordance with the design and color of the embroidery desired.

The loom

Referring now to Figs. 1 to 4, inclusive, the structural framework of the loom includes a set of four vertical posts 21, two at each end, each supported and braced at their lower ends by angle brackets 22. In the embodiment shown the posts 21 are of wood and obviously could be made of metal and angle irons or channels substituted therefor.

The front posts 21 are separated a few inches from the back posts, as best shown in the plan view of Fig. 17, and the upper ends are connected together by cross-connecting members 23. Extending from one front post to the other and from one back post to the other are transversely extending angle members 24, and the four posts thus form a vertical transverse space wherein the frames are movable.

Supported from the two rear posts 21 adjacent the lower half thereof is a horizontal supporting member 26 which has on the upper surface thereof a rod or guide rail 27, as best shown in Fig. 19, which engages guide rollers 28 of an outer or horizontal movable frame, the latter being indicated generally by reference numeral 29. Another transverse member 31 supported from the front posts 21 has on the upper surface thereof a bar 32 engageable with a roller 33 on the horizontal moving frame. Thus the horizontal movable frame 29 is supported in the loom and guided for horizontal movement to and fro on the rod 27 and bar 32.

The horizontal movable frame is generally rectangular and has vertical side frame members 34 and horizontal end frame members 36 suitably secured together at their extremities to form a rigid rectangular shaped frame. The guide rollers 28 and roller 33 are fixed to shafts 37 carried in bearing blocks 38, the latter being supported by angle brackets 39 secured to opposite sides of the frame members 34. The grooves in the peripheries of the guide rollers 28, as best shown in Fig. 19, are of such a size with respect to the diameter of the rod 27 that only the outer surfaces of the grooves engage the rod. Thus there is practically no lateral movement of the guide rollers 28 with respect to the rod 27 and the horizontal movable frame 29 moves with very little or practically no backward and forward movement.

Pivotally mounted on bolts 41, Fig. 17, in the upper horizontal member 36 of the frame 29 is a pair of levers 42, one adjacent each end of the member 36. The outer ends of the levers 42 carry rollers 43 which engage the front transverse structural frame member 24 and thereby guide the upper end of the horizontal movable frame in its transverse movements. The inner ends of the levers 42 have oversized holes through which extend bolts 44 whereby the lever is clamped in an adjusted position.

Extending rearwardly from one of the side members 34 of the horizontal movable frame 29, as best shown in Figs. 19, 20 and 21, is a pair of spaced apart angle members 46. Pivoted on a shaft 47 supported adjacent the center of the angle brackets 46 is a pair of arms 48 which have secured to their outer ends half nuts 49. The half nuts 49 on the arms 48 are urged together by springs 51 attached to studs 52 of the arms whereby the half nuts 49 are held in engagement with a horizontal lead screw 53.

Figure 2:
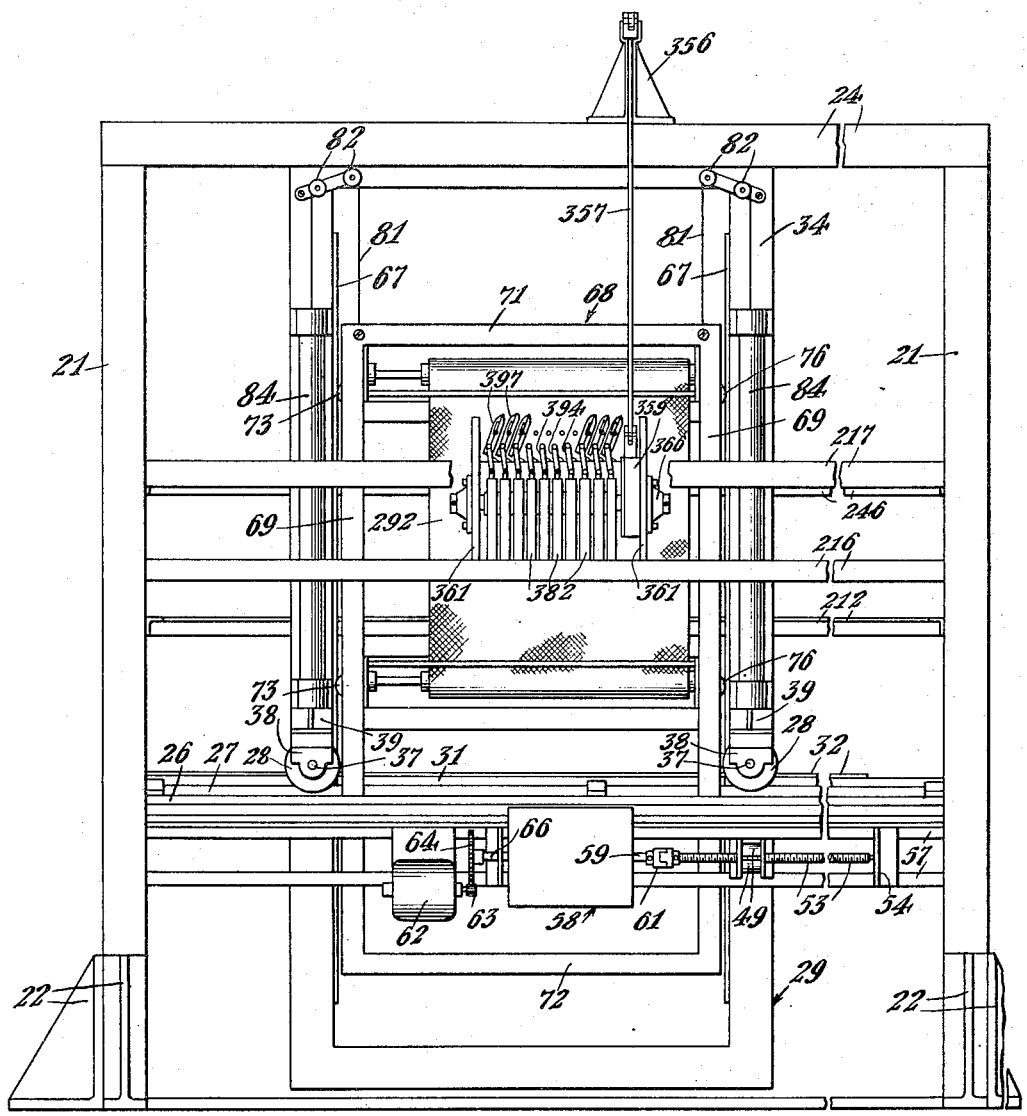
Fig. 2 is a rear elevational view of the machine.
Figure 18:
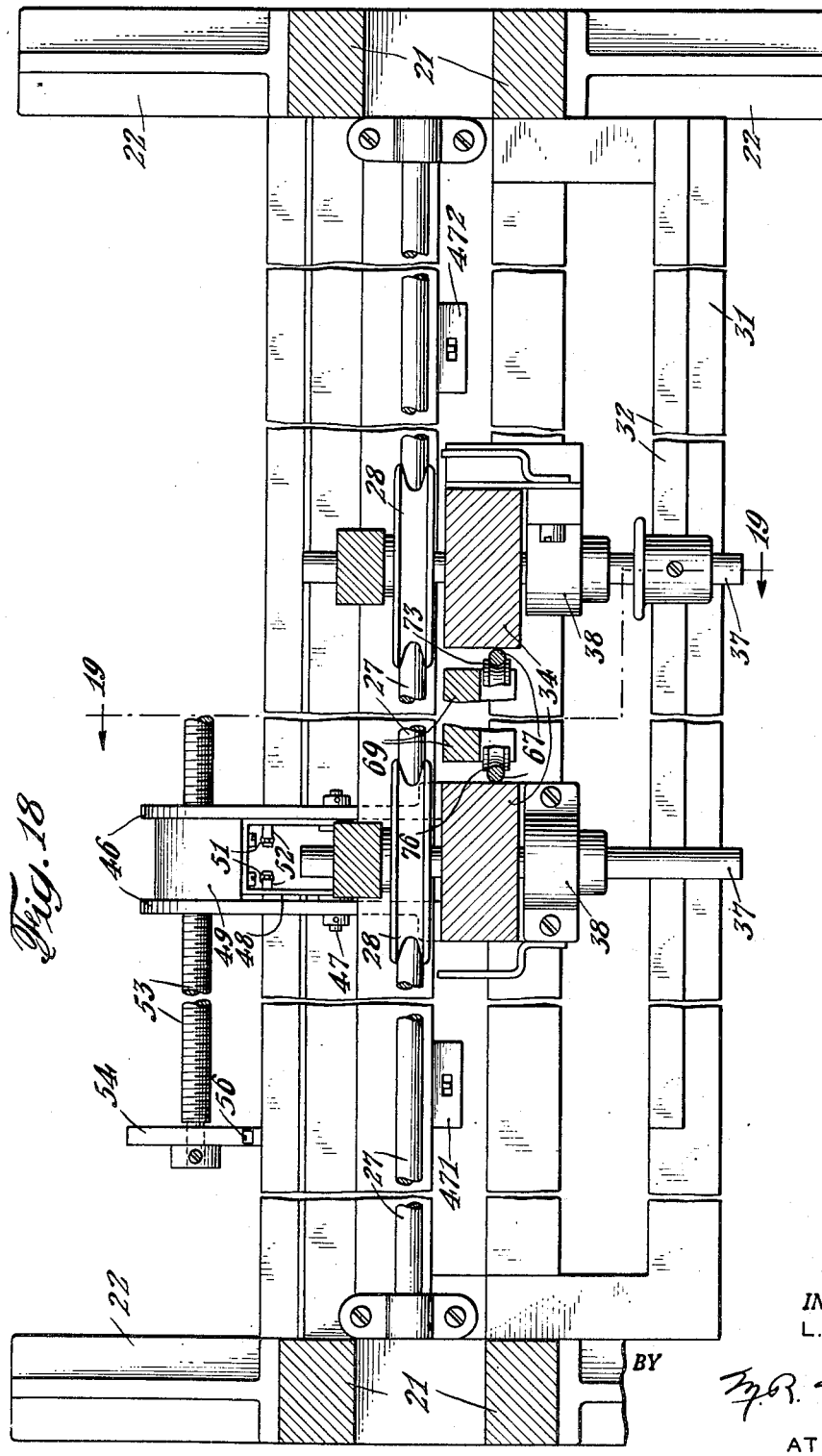
Fig. 18 is a horizontal sectional view of the frame and guides.
Figure 23:
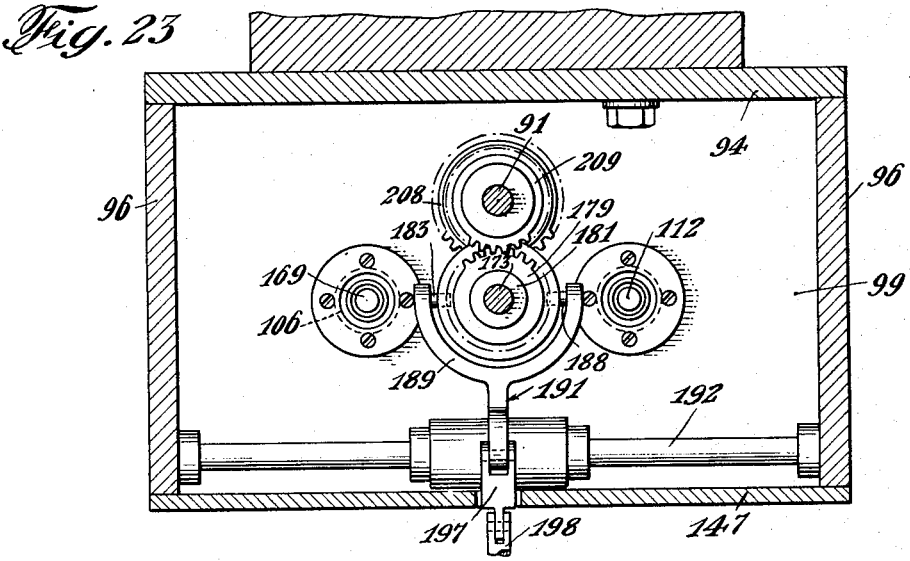
Fig. 23 is a sectional view taken substantially on line 23—23 of Fig. 22.

As shown in Figs. 2 and 18, one end of the lead screw 53 is supported in a bearing post 54 secured by screws 56 to transversely extending frame members 57 of the structural framework. Also secured to the frame members 57 is a control unit indicated generally by reference numeral 58 which has a shaft 59 extending therefrom coupled by means of a flexible coupling 61 to the other end of the lead screw 53. The details of the control unit and its operation will be described hereinafter and its function is to rotate the lead screw 53 predetermined amounts in either direction as governed by the control unit 58. A motor 62, secured to the frame member 57 through a pinion 63 and a gear 64 on a shaft 66 furnishes power to the control unit 58.

As the horizontal lead screw 53 rotates and with the half nuts 49 engaged therewith, the frame 29 will move horizontally either in one direction or the other depending upon the direction of rotation of the lead screw 53. The lead screw 53 is of sufficient length to give the desired amount of movement to the outer frame 29.

Figure 3:
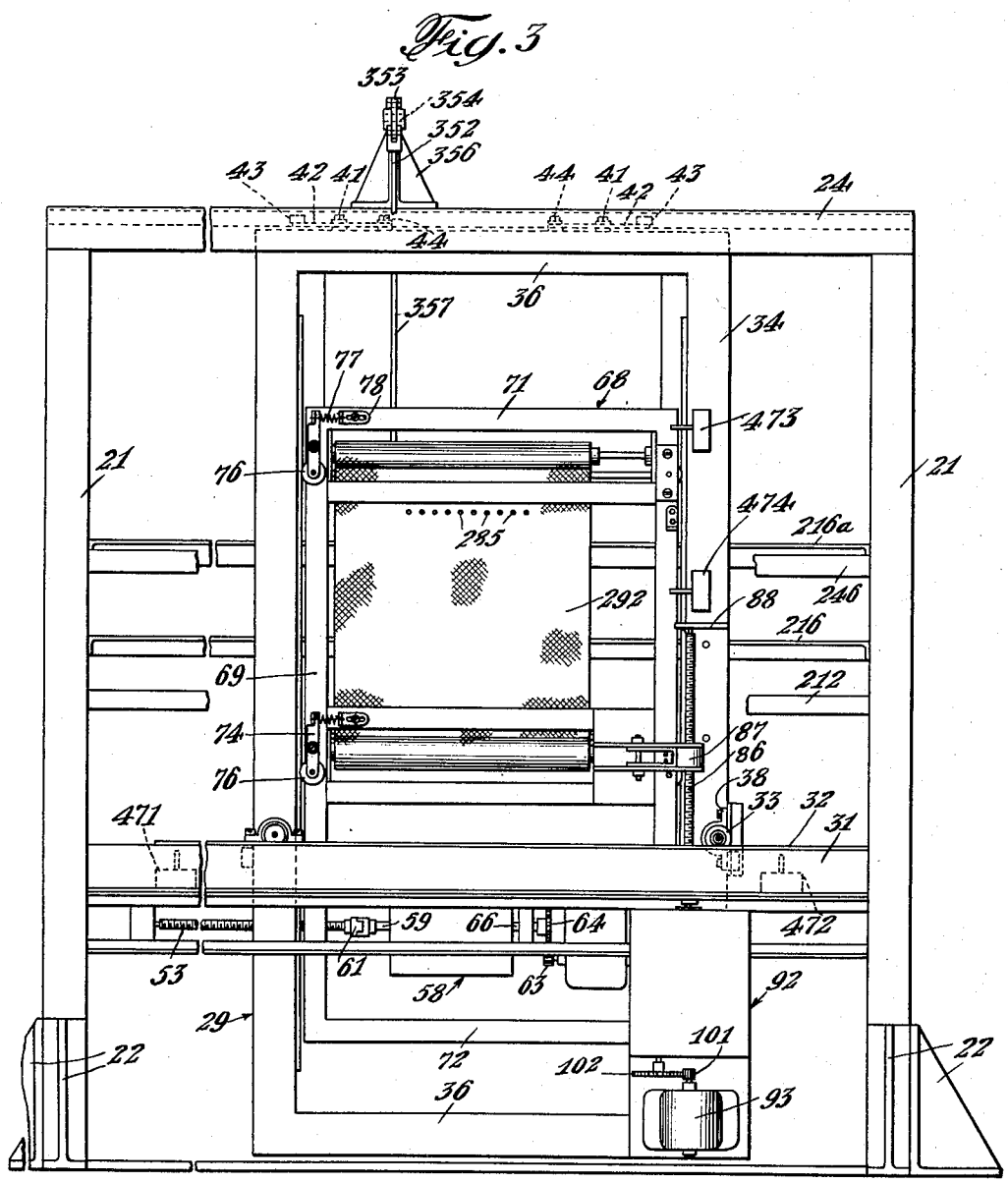
Fig. 3 is a front elevational view of the machine with the needle and operating mechanism therefor removed.

Secured to the inside surfaces of the vertical frame members 34 of the horizontal moving frame 29 is a pair of guide rods 67, Figs. 2, 3 and 18, which guide the smaller inner or vertically movable frame indicated generally by reference numeral 68. This inner frame is rectangular and moves vertically within the outer frame 29. The small inner frame 68 has vertical side members 69 and top and bottom horizontal end members 71 and 72, respectively. Mounted on the right hand vertical member 69, Figs. 1 and 3, of the inner frame 68 is a pair of rollers 73 which engage the rod 67 to guide that side of the inner frame. The other or left hand side of the inner frame 68 has pivotally mounted thereon a pair of levers 74 which carry in their lower ends rollers 76. The upper ends of the levers 74 have springs 77 attached thereto whereby the rollers 76 are held in engagement with the guide rods 67. The pressure of the guide roller 76 against the guide rod 67 may be varied through adjustment of the brackets 78 to which the springs 77 are anchored. Thus the inner vertically movable frame 68 is mounted and guided for vertical movement within the larger horizontally movable outer frame 29.

Figure 4:
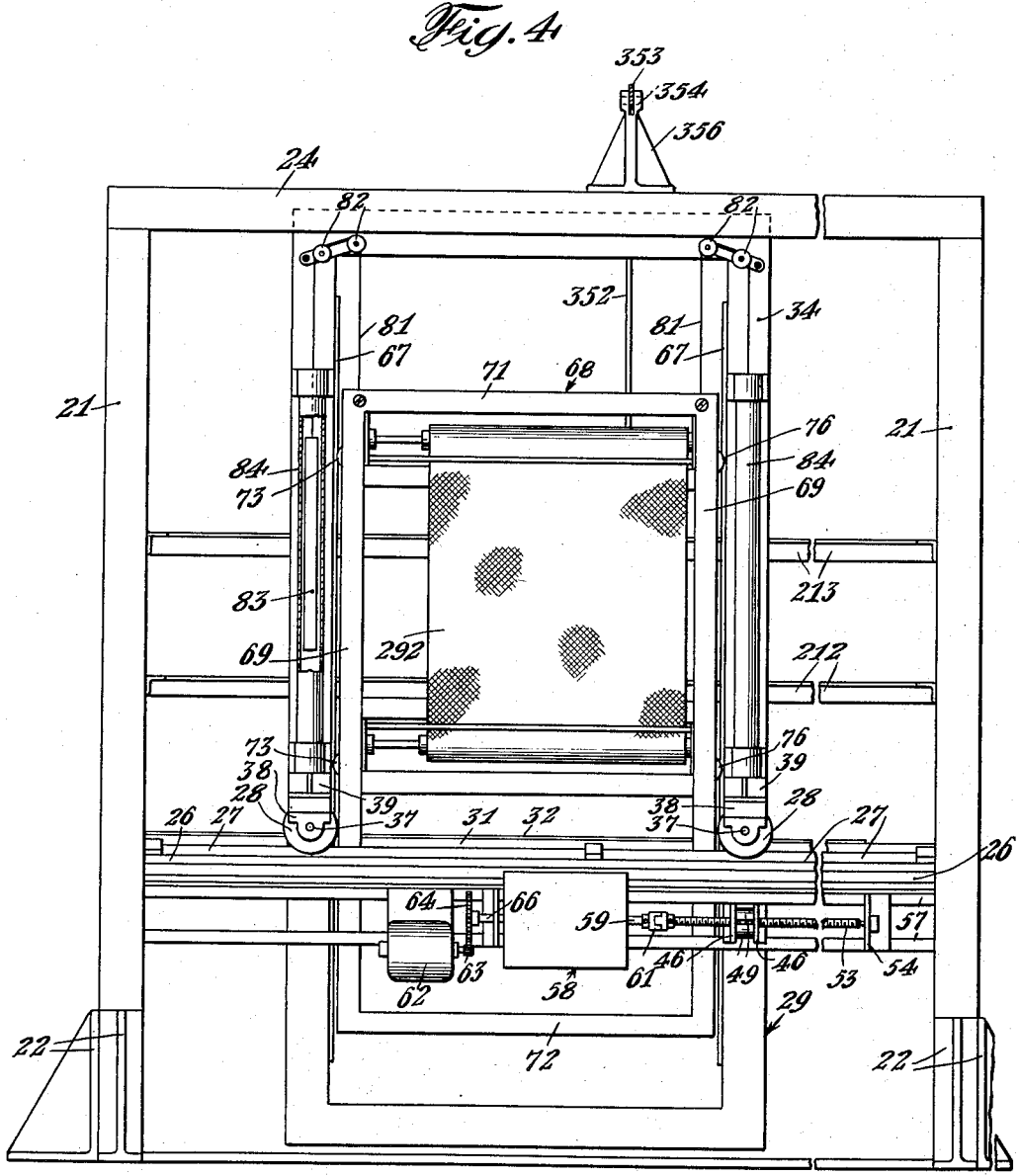
Fig. 4 is a rear elevational view of the machine with the shuttle and operating mechanism therefor removed.

In order to permit the inner frame to move with a minimum amount of force, the same is counterbalanced. The counterbalancing is accomplished by counterbalancing weights 83 secured to the ends of flexible cords 81 (Figs. 2 and 4). The flexible cords 81 have their other ends attached to the upper part of the inner frame 29 and pass over rollers 82 to the weights 83 within the hollow sleeves 84.

Movement of the inner frame in a vertical direction is effected through a vertical lead screw 86, Figs. 1 and 3, engaging half nuts 87 similar to those employed to move the horizontal movable frame 29. The half nuts 87 are supported from the inner frame 68 and the lead screw 86 is pivotally mounted in a bearing post 88 on one of the vertical frame members 34 of the outer frame 29. The lower end of the lead screw 86 is coupled through a flexible coupling 89 to a shaft 91 extending from the upper side of a so-called vertical clutch control unit 92. This control unit with its driving motor 93 is secured to the outer frame and moves horizontally therewith. Rotation of the vertical lead screw 86 in one direction or the other predetermined amounts produces corresponding up or down movement of the inner frame 68.

*The vertical and horizontal clutch control units*

As set forth above, the small inner vertically moving frame 68 and the larger horizontally moving frame 29 are moved through the operation of their associated clutch control units 58 and 92, respectively. The clutch control units 58 and 92 are similar in construction and operate in a similar manner, and the details of one, such as the vertical clutch control unit 92, are shown in Figs. 22 to 30, inclusive. Since the two clutch control units are similar in operation and construction, only the vertical clutch control unit 92 is shown in detail and only the elements of this unit will be described.

The clutch control unit 92 of Figs. 22 to 30 has a back plate 94, a pair of side plates 96 and top and bottom plates 97 which together with the cover 98 (Fig. 1), removed in Fig. 22, comprise the housing for the unit. The various abovementioned plates together with a central plate 99 of the housing provide supports for various shafts, pivot rods, and operating elements of the unit.

During operation of the loom the motor 93 for supplying power to the vertical clutch control unit 92 is continuously rotating and through a pinion 101 on the motor shaft the gear 102 is rotated. The gear 102 is fixed to the lower end of a shaft 103 for rotation therewith by means of a gear hub 104. The shaft 103 extends from below the bottom housing plate 97 into the control unit to the center mounting plate 99, it being journalled in bearings 106 in these plates.

Fixed to the shaft 103 just above the lower housing plate 97 is a gear hub 108 which has fixed thereto a gear 107. The gear 107 meshes with and drives a similar gear 109 fixed to a hub 111 secured to a shaft 112. The shaft 112 is journalled in the lower housing plate 97 and the center housing plate 99 in the same manner as shaft 103, and through the above-described elements these shafts are continuously rotated in opposite directions from the motor 93. Each of these shafts has a similar arrangement of elements mounted thereon and through these elements the associated lead screw 86 is rotated, either in one direction or the other, to produce upward or downward movement of the inner frame 68.

Since the elements on these two shafts are similar, the description will be limited to only one set of these elements, those on shaft 112, and the manner of operation thereof. Referring now to Fig. 26, which is a sectional view taken along the axis of shaft 112, it will be noted that the upper face of the gear hub 111 has a set of gear teeth 113 formed thereon which comprise the driving element of a ratchet clutch indicated generally by reference numeral 114. The teeth 113 are in operative relation with a corresponding set of teeth 116 on the lower end of a sleeve 117 loosely mounted on an inner sleeve 118 on the shaft 112. The inner sleeve 118 has adjacent its upper end a flange 119 and secured to the upper and lower faces of the flange by means of pins 121 is a gear 122 and a disc cam 123, respectively. The gear 121 and cam 123 are thus rotatable with the sleeve 118.

The outer sleeve 117 has on the upper end thereof, as best shown in Fig. 25, a plurality of axially extending slots 124 which engage corresponding tongues 126 extending downwardly from the lower face of the cam 123. Through the slots 124 and tongues 126 the outer sleeve 117 is axially movable within certain limits along shaft 112 but is coupled to the inner sleeve 118 for rotation therewith.

Fixed to the outer sleeve 117 adjacent the center thereof by means of a key 127 and set screws 128, Fig. 27, is a collar 129. The collar 129 has a radial flange 131 adjacent its center which has the underside thereof in operative relation with arms 132 of a yoke 133. The yoke 133 is pivoted on a fixed stud 134 and as shown in Fig. 25, has fixed to the rightwardly extending arm thereof by means of screws 136 a small latching block 137. The yoke 133 has attached thereto a spring 138 which tends to pivot the yoke in a counterclockwise direction, as shown in Fig. 25, to hold the upper right hand corner of the latching block 137 in engagement with a latching surface 139, adjacent the lower end of a trip lever 141. The trip lever 141 thus, in the position shown in Fig. 25, retains the yoke 133 in its unoperated position, which, through its arms 132, holds the outer sleeve 117 on the shaft 112 in its normal up position against the action of a compression spring 142, Fig. 26, urging the sleeve 117 in a downward direction. The spring 142 abuts the lower face of the cam 123 and a flange 140 adjacent the center of the outer sleeve 117.

The trip lever 141 forms one arm of a bell crank 143, best shown in Fig. 29, pivotally supported on a pin 144 in a bracket 146 secured to the clutch control unit top plate 147. The horizontal arm 148 of the bell crank 143 has secured thereto a soft iron plate 149 in operative relation with the pole piece of a magnet 151 located thereabove. A spring 152 attached to a leftwardly extending arm of the bell crank 143 and anchored in a post 153 tends to rotate the bell crank in a clockwise direction to hold the latching surface 139 in operative relation with the upper surface of the latching block 137.

When the magnet 151 is energized, the bell crank 143 is rotated counterclockwise, Fig. 29, to disengage the latching surface 139 from the latching block 137. Thereupon the springs 138 and 142 rotate the yoke 133 in a counterclockwise direction and move the sleeve 117 in a downward direction. This permits the teeth 116 on the lower end of the sleeve 117 to engage with the teeth 113 on the rotating gear hub 111. The sleeve 117 is thus coupled to the gear hub 111 for rotation therewith and through mechanisms hereinafter described, the sleeve with its attached elements is rotated for one complete revolution whereupon the teeth 113 and 116 are disengaged.

Figure 24:
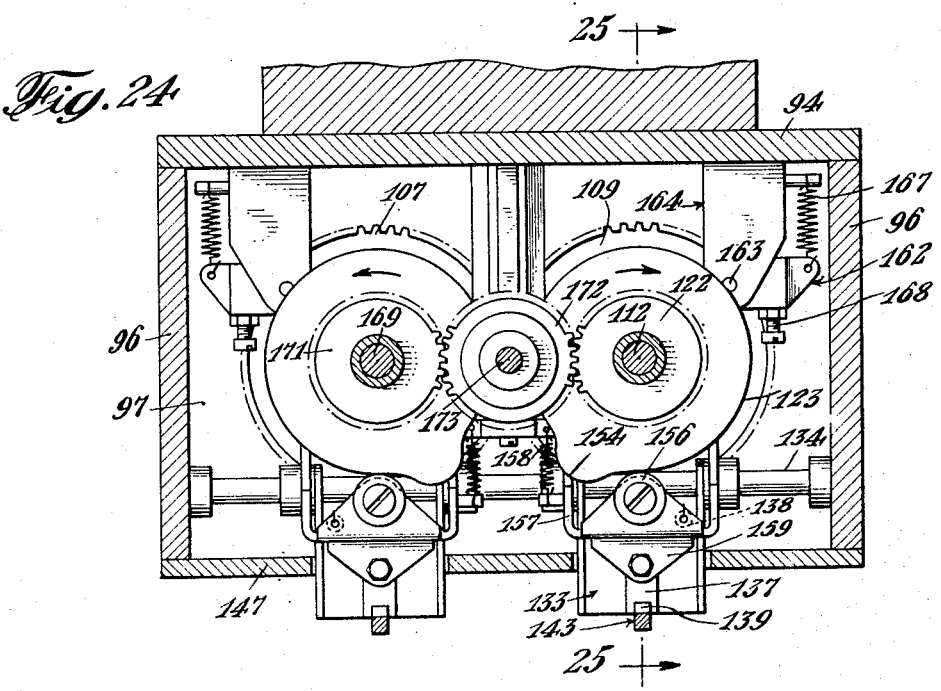
Fig. 24 is a sectional view taken substantially on line 24—24 of Fig. 22.

Just before the sleeve 117 with its attached elements completes a revolution, the lobe 154, Fig. 24, on the cam 123 engages a roller follower 156, Figs. 24, 25 and 29. The roller follower 156 is mounted in the base of a U-shaped member 157 pivoted on the stud 134 and the engagement of the cam lobe with the follower causes the U-shaped member to pivot in a clockwise direction as shown in Figs. 25 and 29. This pivoting of the U-shaped member 137 is against the action of an attached spring 158 which has a considerably greater effect on the member 157 than has spring 138 tending to pivot the same in a clockwise direction and which is also attached to the yoke 133. A rightwardly extending arm 159 of the U-shaped member 157 carries an adjustable screw 161, the lower end of which is in operative relation with the upper face of the latching block 137. When the trip lever 141 is tripped, the latching block engages the lower end of the adjustable screw 161 and as the U-shaped member 157 is rocked by the cam 123, the yoke is returned to its normal position, such as that shown in Figs. 25 and 29.

The magnet 151 is momentarily operated and will accordingly permit the bell crank 143 to be released ready to latch the yoke 133 in its normal unoperated position when returned to this position by the member 157. As the yoke 133 is moved back into its normal position, the arms 132 engaging the lower face of the flange 131 of the collar 129 on the sleeve 117 raise the sleeve assembly and thereby disengage its teeth from those on the constantly rotating gear hub 111. Thus the sleeve 117 with its attached elements is permitted to make one revolution in conjunction with each energization of the magnet 151. The speed of rotation of the various elements including the gear hub 111 with respect to the rapidity with which the magnet 151 is energized is such that the sleeve assembly will be in its normal stop position before the magnet 151 is reenergized.

In order to prevent overtravel of the assembly on the sleeve 117 and to bring the same to rest in its normal stop position and permit only one revolution thereof at a time, a latch lever 162, Fig. 28, is employed. This lever is pivotally mounted on a pin 163 supported on a post 164 and has its left hand end in operative relation with a cam 166 formed on the periphery of the collar 129 rotatable with the sleeve 117. When the sleeve assembly 117 drops down, as shown in Fig. 26, the cam 166 clears the end of the latch lever 162 and the latter is no longer effective to prevent rotation thereof. This rotation is in a clockwise direction as shown in Fig. 28, and when the sleeve assembly is returned to its normal unoperated position, the edge of the cam 166 is moved back into operative relation with the end of the latch lever whereby the same is stopped on completing its revolution. A spring 167 attached to the right hand end of the latch lever holds the left hand end in operative relation with the cam 166 and an adjustable screw 168 carried in the lever 162 limits the pivoting of the said lever.

The shaft 103 has a similar set of elements that operate in a manner similar to those described on shaft 112 and include a ratchet clutch 169 and a gear 171. The gear 171, like the gear 122, is adapted to make one revolution at a time whenever its associated trip magnet, similar to magnet 151, is energized. It will be noted that the gears 122 and 171 are driven through their respective clutches 114 and 169 one revolution at a time in opposite directions and, as shown in Figs. 22 and 24, both of these gears engage a gear 172. Accordingly, the gear 172 will be rotated in one direction or the other depending upon which clutch 114 or 169 is operated. When one gear, 122 or 171, is being driven through its respective clutch, the other gear with its associated elements is rotated through the gear 172 in a direction opposite to that which its clutch rotates it.

Gear 172 is fixed to the lower end of a shaft 173 for rotation therewith and the shaft is pivotally supported in bearings 174 and 176' in the central mounting plate 99 and the top housing plate 97. The central section of the shaft 173, as best shown in Figs. 30 and 31, is enlarged and has a pair of diametrically opposed splines 174' thereon. The splines engage corresponding internal grooves in a shift member 176 surrounding the enlarged section of the shaft. Through the splines the shift member 176 is rotatable with the shaft but is axially movable therealong in a manner hereinafter pointed out.

Loosely mounted on the shaft 173 below the shift member 176 is a gear 177. The upper end face of the gear abuts the enlarged central section of the shaft and the lower face abuts a collar 178 pinned to the shaft. Another gear 179 is loosely mounted on the shaft 173 just above the shift member 176 and is prevented from moving axially therealong by a collar 181 abutting the upper face and by reason of the lower face abutting the enlarged center section of the shaft.

Extending upwardly from the upper face of the gear 177 is a pair of diametrically opposed teeth 182, Fig. 29, which with the shift member 176 in its lower position are engageable with cooperating recesses on the lower face of the shift member whereby the gear 177 is coupled to the shift member 176. Similar teeth 183 on the lower face of the gear 179 are engageable with recesses 184 on the upper face of the shift member 176. However, when the shift member is in its lowermost position, as shown in Fig. 29, the teeth 183 are disengaged from the recesses 184 and gear 179 is free to rotate independently of the shift member 176. With the shift member 176 in its upper position the gear 179 is coupled to the shaft 173 and the lower gear uncoupled therefrom and free to rotate independently.

Adjacent the center of the shift member 176 is a groove 187 formed between a pair of radially extending flanges 186. A pair of pins 188, Figs. 30 and 31, adjacent the ends of arms 189 of a shift fork 191 engage the groove 187 to move the shift member axially of the shaft 173. The shift fork 191, Fig. 29, is pivotally mounted on a rod 192 and is held in place by collars 193, Fig. 22. The shift fork 191 also has an upwardly extending arm 194 and downwardly extending arm 196, to which are pivotally attached links 197. The other ends of the links 197 are attached to plungers 198 of a pair of solenoids 201 and 202. The solenoids are mounted one above the other on a bracket 203 which is attached to the cover plate 147 of the clutch control unit 92.

Either one or the other of the solenoids 201 and 202 is energized at a time and through the described linkages move the shift member 176 up and down along the shaft 173. The shift fork 191 is retained in either one or the other of its operated positions by detent spring arms 204 secured to the right hand end of the bracket 203. The arms 204 have rounded projections 206 adjacent the free ends thereof which engage notches 207 in the right hand end of the solenoid plungers 198. Fig. 29 shows the elements associated with the shift fork 191 after the solenoid 202 has been energized and in this position the gear 177 is coupled to the shaft 173 for rotation therewith. The energization of solenoid 201 will effect uncoupling of the gear 177 from the shaft and coupling of the gear 179 thereto.

The gear 177 is somewhat smaller than the gear 179 and both of these gears mesh with gears 208 and 209, respectively, secured for rotation therewith to the shaft 91 which extends from the top of the clutch control unit 92. The shaft 91 is pivotally mounted in bearings 210 and has one part of the flexible coupling 89 secured to the upper end thereof, the other part being secured to the lower end of the lead screw 86. The gear 172 on shaft 173 is the same size as gears 122 and 172, and therefore the shaft 173 makes one revolution in one direction or the other whenever one of the clutches 114 or 169 is operated. The position of the shift member 176 determines which of the gears 177 or 179 on the shaft 173 drives the shaft 91 and thus the degree of rotation of the shaft 91 during different cycles of operation. With the shift member 176 in its lower position the smaller drive gear 177 rotates the gear 208 and shaft 91 one increment whereas with the shift member 176 coupled to the gear 179 to drive the same, the larger gear 179 driving the gear 209 rotates the shaft 91 in the same direction a different increment. In the preferred embodiment of the invention the sizes of these gears are such that the one increment of rotation of the shaft 91 is twice that of the other or one half revolution and one full revolution. When one of the gears 177 or 179 is coupled to and rotating with the shaft 173, the other gear rotates idly thereon.

The two increments of rotation of the shaft 91 in either direction for a cycle of operation of clutch 114 or 169 produce corresponding rotation in the lead screw 86. The lead screw is arranged so that one increment of rotation produces one-sixteenth of an inch movement of the associated inner frame 68, and the other increment of rotation produces movement of one-thirty-second of an inch. Such movement of the frame permits the stitches to be separated either one-sixteenth or one-thirty-second of an inch, and this operation may be controlled remotely through the energization of one or the other of the solenoids 201 or 202.

The clutch control unit 58 for the outer frame 29 operates in the same manner to rotate the horizontal lead screw 53 in either direction one or two increments or one half or a full revolution. The clutch control units 58 and 92 operate independently of each other and both may operate simultaneously or during a single cycle to produce diagonal movement of the inner frame 68. Depending upon which of the shift solenoids, such as 201 and 202, of the clutch control units 59 and 92, and which of the magnets such as 151 are energized, the resultant inner frame movement can be in any one of sixteen different directions during a cycle of operation of the machine. These directions include the up, down, right and left, as well as diagonal movements on a two to one, a one to one, and a one to two slope.

*The needle and shuttle mechanisms*

Figure 5:
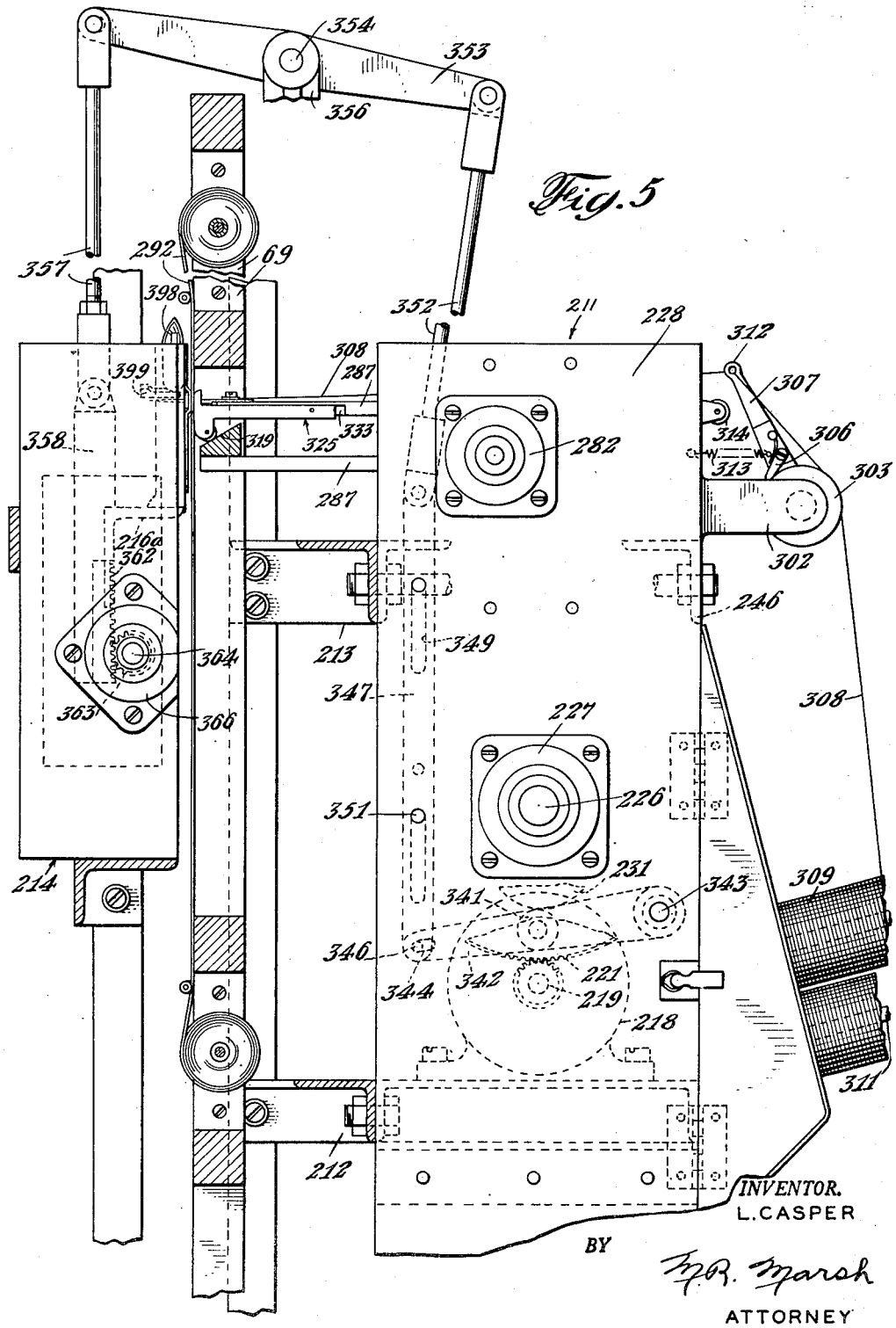
Fig. 5 is a vertical sectional view taken substantially on line 5—5 of Fig. 1 showing principally the side of the needle and shuttle operating mechanisms.

The needle and shuttle mechanisms are fixedly mounted on opposite sides of the structural framework and co-operate with one another through the fabric worked upon. The needle mechanism comprises a generally box-shaped mechanism indicated generally by reference numeral 211 and is supported on the front of the machine by means of transversely extending angle irons 212 and 213, Fig. 5, of the structural frame. The shuttle mechanism referred to generally by reference numeral 214 is also generally box-shaped and is mounted upon an angle iron 216 and a bar 217 extending transversely of the machine and comprising elements of the structural frame.

The needle mechanism 211, Figs. 5, 6, 7, 8, 9, 11, 12 and 15, comprises in general, along with other mechanism hereinafter described, a series of horizontal needles mounted side by side and arranged for movement through the fabric located in a vertical plane in front of the needles. In the preferred embodiment of the invention there are ten needles and each one may be operated by the needle mechanism independently of the others. However, as hereinafter described, groups of predetermined numbers of the needles may be operated simultaneously.

The shuttle mechanism positioned on the opposite side of the fabric from the needle mechanism comprises in general a series of shuttles, one for each of the needles. A shuttle is arranged to be operatively actuated whenever its corresponding and associated needle is operated in a stitching cycle, and like the needles, are arranged for operation in groups when desired but normally operate one at a time. The power for operating the needle and shuttle mechanisms 211 and 214 is furnished by an electric motor 218 in the needle mechanism, and the application of the power to the various needle and shuttle units is controlled through the medium of electro-responsive means, such as electromagnets, selectively operated under the control of an electrical control unit. Through the electrical control unit the operations of the needle and shuttle mechanisms are performed in timed relation with the movements of the two frames so that the fabric worked upon is stationary during a stitching operation.

The needle and shuttle operating motor 218 is normally rotating and a pinion 219 on the motor shaft engages a gear 221 to continuously rotate the latter. The gear 221 rotates with a flywheel 222 which is fixed to a hub 223 mounted on the sleeve 224. The sleeve 224 is freely mounted on a drive shaft 226 and in the idle condition of the needle mechanism the gear 221 and flywheel 222 rotate idly on the shaft 226. The shaft 226 is journalled in bearings 227 fixed to side plates 228 of the needle mechanism and has fixed thereto for rotation therewith a pair of cams 231 and 232, a so-called shuttle operating cam, and a so-called needle operating cam, respectively.

The left hand face of the flywheel hub 223, as shown in Figs. 8 and 11, has formed thereon a plurality of radial teeth 233 in operative relation with similar teeth on the right hand face of a clutch member 234. The teeth on these two members comprise what is hereinafter referred to as the needle and shuttle operating clutch and is indicated generally by reference numeral 236. The clutch element 234 is keyed to the shaft 226 by a key 237 and is movable axially therealong to bring its teeth into and out of engagement with the teeth 233 on the continuously rotating hub 223. A compression spring 238 pressing against a collar 239 on the shaft 226 and the left hand face of the clutch member 234 normally urges the clutch member to the right and its teeth into engagement with those on the hub 223.

The clutch member 234 has a track or cam groove 241 around the central section thereof in which rides a cam follower 242. This follower 242 is in the lower end of a trip arm 243 pivotally supported on a fixed pivot rod 244 in the needle mechanism. In operative relation with a pin 247 adjacent the center of the trip arm 243 is a notch 249 of a latch 248, Fig. 11. The latch 248 is pivoted at 251 and has attached thereto a spring 252 normally tending to pivot the same to move the notch 249 into latching engagement with the pin 247. The latch 248 also has attached thereto a link 253, the upper end of which is pivotally connected to the plunger 254 of a trip solenoid 256. The solenoid 256 and latch 248 are mounted on a plate 258 secured to a frame member by screws 259.

In the idle rest or normal positions of the needle and shuttle mechanism, the cam follower 242 engages the low or normal part of the cam groove 241 and thus holds the clutch member 234 to the left, Fig. 11, with its teeth out of engagement with the constantly rotating teeth of the hub 223. To initiate the needle and shuttle mechanisms into a cycle of operation, the solenoid 256 is energized so that the notch 249 in the latch 248 is moved out of engagement with the pin 247 whereupon the spring 238 moves the clutch member 234 to the right to bring its teeth into engagement with those on the hub 223. The shaft 226 then rotates with the gear 221 and flywheel 222. The solenoid 256 is only momentarily energized and before the shaft 226 has made a full revolution the spring 252 pivots the latch 248 back into operative relation with the pin 247. Then as the lobe 261 of the cam groove causes the trip arm to pivot to the position shown in Fig. 11, the notch 249 will engage the pin 247 and prevent movement of the trip arm 243 to the right. Further rotation of the clutch member 234 under this condition causes it to be cammed to the left against the action of spring 238 and thereby disengage its teeth from those on the hub 223. Thus the operating shaft 226 for the needle and shuttle mechanisms is released for one revolution at a time in conjunction with each energization of the solenoid 256. The needle mechanism is operated by the above-mentioned needle cam 232 on the shaft 226 and the operation of these elements will first be described followed by those operated by the shuttle cam 231.

Figure 6:
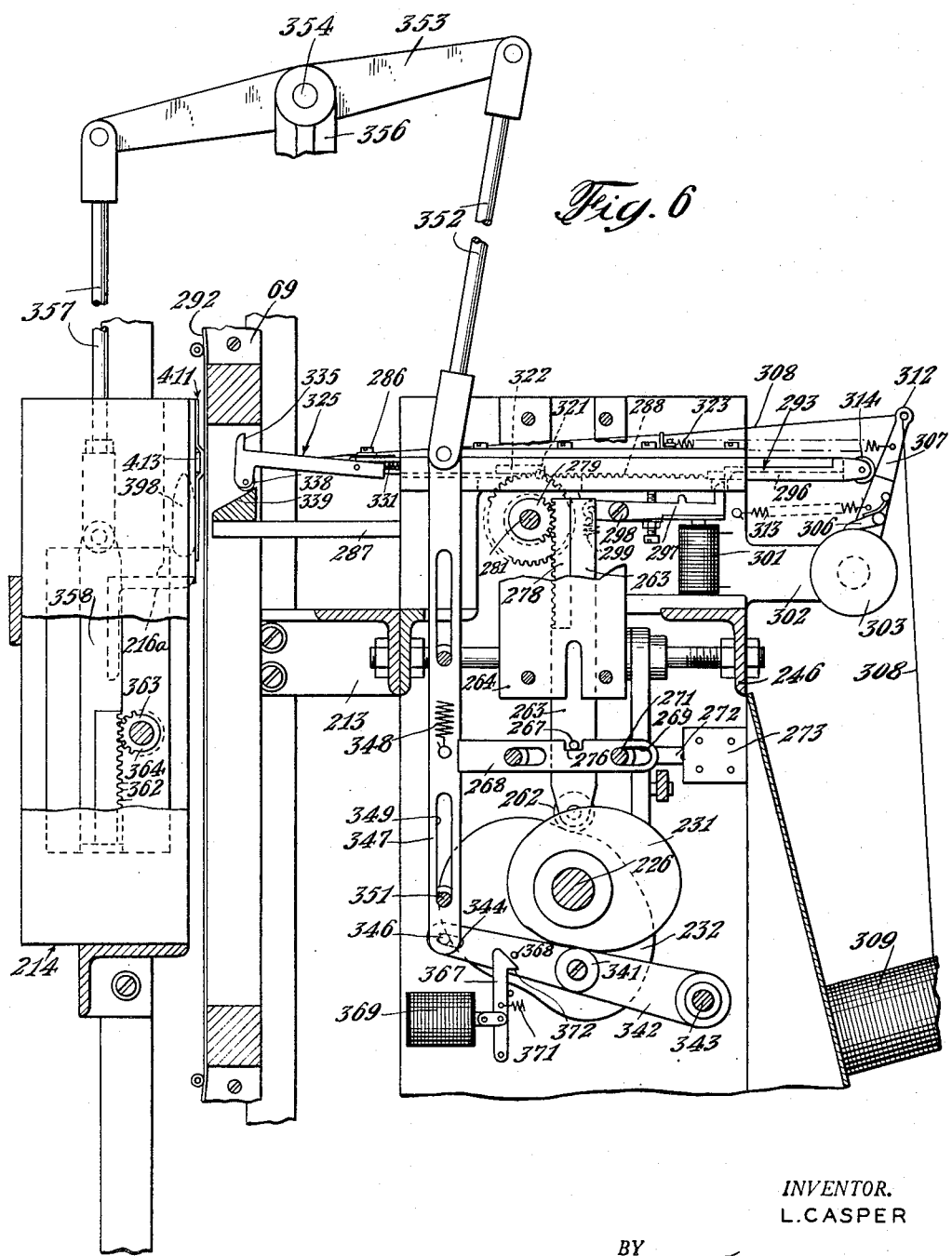
Fig. 6 is a view somewhat similar to Fig. 5 showing some of the details of the needle and shuttle mechanisms.

Positioned so as to contact the periphery of the needle cam 232 is a roller cam follower 262, Figs. 7 and 11, carried on the lower end of a slide bar 263. The slide bar 263 is movable in a vertical slot in a block 264, best shown in Fig. 12, which has a cover plate 266 secured thereto to maintain the slide bar in the groove. Extending from the side of the slide bar 263 adjacent the lower half thereof is a pin 267 which protrudes out over a horizontal stop bar 268. The stop bar 268 has a pair of elongated slots 269 therein through which extend pins 271 whereby the bar is arranged for horizontal movement. The right hand end of the stop bar 268, Fig. 6, is attached by means of a link 272 to the plunger (not shown) of a so-called cut-off solenoid 273. When the solenoid 273 is energized, the stop bar 268 is moved to the right, to the position shown in Fig. 6, against the action of an attached spring 274 and in this position a notch 276 in the upper surface of the stop bar is in the path of the pin 267. With the notch 276 in the path of travel of the pin 267, the cam follower 262 in the lower end of the slide bar 263 is permitted to drop to the full depth of the needle cam 232, such as the position shown in Fig. 6. When the solenoid 273 is released, the notch 276 moves out from beneath the pin 267 and the stop bar 268 prevents the slide bar 263 from moving to its lowermost position; and the cam follower 262 during such times will not contact the deepest part of the cam 232. The slide bar 263 is urged in a downward direction by means hereinafter described.

As described more fully hereinafter, the movement of the slide bar 263 to its lowermost position restores the previously operated needle or needles to latched or unselected positions whereas the movement of the slide bar to its intermediate position with the pin 267 therein engaging the top of the stop bar 268 merely withdraws the operated needle or needles preparatory to making another stitch. The withdrawing of a needle or needles to unselected or latched positions is effected when, for example, it is desired to change from one needle or needles to others, as when changing from one color or colors of yarn to others.

Secured to the upper left hand side of the slide bar 263, Figs. 6, 7 and 11, by screws such as 277 is a rack 278, the teeth of which are adapted to engage a pinion 279. The pinion 279 is fixed for rotation therewith to a horizontal shaft 281 mounted in bearings 282 in the side plates 228 of the needle mechanism. During operation of the needle mechanism 211 the needle cam 232 causes the slide bar 263 and rack 278 to move up and down once for each revolution of the shaft 226, and during such movement the needle mechanism is operated through one cycle. Through the rack 278 and pinion 279 this vertical movement of the slide bar 263 is converted into rotary movement of the shaft 281. In a normal stitching cycle of operation, or after a needle is selected, the shaft 281 is rotated approximately half a revolution, first in a counterclockwise direction and then an equal amount in a clockwise direction. During such cycles of operation the slide bar 263 does not move to its lowermost position and it is only when the solenoid 273 is energized that the slide bar causes the shaft 281 to rotate in a clockwise direction an additional amount whereby the previously operating needle or needles are latched in their normal unselected positions.

Spaced along the shaft 281 and keyed thereto for rotation therewith as shown in Figs. 11 and 15 is a set of needle or needle bar operating gears 283. There is one needle bar operating gear 283 for each needle and in the embodiment shown there are ten of these gears. The needles 284, Figs. 12 and 15, are secured by means of screws, such as 286, and clamping plates 295, to the left hand ends of respective needle bars 287. Each needle bar 287 is located above its respective needle operating gear 283 and has adjacent the center of the underside thereof a toothed rack 288 engageable at times with its associated needle gear. Each needle bar 287 is guided for horizontal movement in the upper part of its respective mounting plate or bracket 289, Figs. 11 and 15, which has a cap plate 291 attached to the top of the bracket to hold the bar in position. The brackets are suitably mounted on the transverse frame member 246 of the needle mechanism. In Fig. 15 the needle bar 287 is shown in its operated or extreme left hand position with the needle 284 thereof projecting through the fabric 292 to be embroidered, and in Fig. 15a the needle bar 287 with its associated elements is shown in its normal unselected or latched position.

Each needle bar 287 has secured to the underside of the right hand end thereof a latching member 293 having a latching surface 294 at its left hand end and a longitudinal groove 296 along its underside. In the normal position of the needle bar 287 the latch surface 294 engages with the tip of a latch lever 297 to hold the needle bar in its normal latched position. The latch lever 297 is pivoted on a shoulder screw 298 in the mounting bracket 289 and has a spring 299 attached thereto normally tending to pivot the same into a latching position. The latch lever 297 is operated by an associated magnet 301 to release the needle bar 287 for movement toward the left in a manner hereinafter set forth.

The mounting plate 289 has a rightwardly extending arm 302 which carries a pivot for a thread or yarn feeding wheel 303 rotatable with a toothed ratchet 304. The teeth of the ratchet 304 co-operate with a spring biased pawl 306 carried on an arm 307 pivoted concentrically with the feed wheel 303. The thread or yarn 308 from the supply bobbin 309 mounted on spindle 311 is wound around the feed wheel 303 and then passes through the eye 312 at the end of the arm 307 to the needle 284. A spring 313 anchored in the mounting plate 289 and attached to the arm 307 tends to pivot the same in a counterclockwise direction. With the needle bar 287 in its operated position, the spring 313 holds the arm 307 against a stop pin 305 and as the needle bar 287 moves to the right, a roller 314 in the right hand end of the latch member 293 engages the arm and rocks it in a clockwise direction. This rocking of the arm 307 moves the pawl 306 backward on the ratchet 304 and during the next forward movement of the needle bar the pawl rotates the feedwheel 303 to unwind the yarn or thread 308 from the bobbin.

*Selecting a needle for operation*

Let it be assumed that the needle 284 of Figs. 15 and 15a is to be selected to perform stitching operations during following cycles of operation of the needle mechanism; the manner in which this is done will now be described. As set forth, a needle with its associated needle bar 287 is latched in its extreme right hand or idle unselected position, by means of the associated latch lever 297—as shown in Fig. 15a. It will be noted that in such a position the teeth of the rack 288 on the underside of the needle bar 287 are to the right and not in engagement with those of the associated needle gear 283. Hence, with a needle bar in its latched position the associated needle gear 283 may rotate, in this case in a counterclockwise direction, without imparting movement to its needle bar 287.

When a stitching operation is to be performed, the magnet 256 is energized to cause engagement of the clutch 236 and rotation of the needle cam 232, which as described oscillates the slide bar 263 to cause rotation of the shaft 281 on which the needle gears 283 are mounted. In timed relation to the operation of the needle cam 232 the trip magnet 301 of the needle bar to be operated is energized to release its associated needle bar 287.

In the normal rest position of the needle mechanism, the condition wherein all the needle bars 287 are in their extreme right hand position and latched against movement by associated latches such as 297, the stop bar 268 is positioned to permit the cam follower 262 to engage the section of the needle cam 232 having the least radius. Rotation of the needle cam from this position elevates the slide bar 263 and causes the needle gears 283 to rotate in a counterclockwise direction. Each needle gear 283 has a pin 321 extending radially out beyond the teeth thereof and it controls the first part of the leftward movement of a needle bar. The pin 321 of the needle unit of Fig. 15a is in operative relation with a recess 322 formed in the underside of the needle bar to the left of the rack teeth 288, and as the pin moves to the left during the first part of the revolution of the needle gear 283, the needle bar moves therewith. The force imparting such movement to the needle bar 287 is derived from a spring 323 attached thereto as well as the spring 313 attached to the lever 307. After a relatively small and predetermined amount of movement of the needle bar 287 to the left as the pin 321 rotates in a counterclockwise direction, it being assumed that the trip magnet 301 is at this time energized, the teeth of the rack 288 engage those of the needle gear 283. Now the needle bar 287 is positively coupled to its needle gear 283 and as the needle gear continues to rotate, the needle bar will move to the left sufficiently to permit the needle 284 to pierce the fabric 292 and thus perform the first part of a stitching operation.

As indicated in Fig. 10, the periphery of the needle cam 232 is such that the needle gear 283 after being rotated to its extreme counterclockwise position, which is sufficient to move the needle 284 to its extreme left hand position, is next rotated a slight amount in a clockwise direction and then again in a counterclockwise direction to return the needle to its extreme left hand position. This retraction of the needle 284 a slight amount forms a loop in the thread or yarn 308 on the back side of the fabric 292 worked upon so that the shuttle may be passed therethrough and lock the stitches. The shuttle operation will be described in detail in the following paragraphs.

Following the second movement of the needle 284 to its extreme left hand position, the needle gear 283 next rotates in a counterclockwise direction to withdraw the needle from the fabric. When the same needle is to be reactuated, the needle bar is not moved to the right sufficiently to permit its associated latch lever 297 to engage the latching surface 294 or to cause disengagement of the teeth of the rack 288 from those of its needle gear 283. To prevent the needle gear 283 from rotating back into the position shown in Fig. 15a, the solenoid 273 is released to permit the horizontal stop bar 268 to move to the left to a position such as that shown in Fig. 7 where the notch 276 therein is out of operative relation with the pin 267 of the slide bar 263. The solenoid 273 is released in timed relation with the energization of the solenoid 256 and the trip magnet 301, and since the slide bar is not permitted to move to its lowermost position, the needle gear 283 will not be permitted to rotate a sufficient amount in a clockwise direction to enable the pin 321 to operatively engage the right hand end of the recess 322 in the needle bar. Hence, during all following operations of the needle mechanism wherein the needle cam 232 makes one revolution in conjunction with each cycle, the selected needle such as 284 will be operated through a stitching operation and between such operations the various frames carrying the fabric worked upon may be moved so that the desired design is embroidered.

In conjunction with each stitching operation and complete cycle of the needle bar 287 the thread or yarn 308 is pulled from the bobbin 309 and made available for the stitching. The selected needle and needle bar will continue to be operated during each following cycle of operation of the needle mechanism or until it is desired to change the color of the yarn being worked by the selection of another needle.

When it is desired to return the needle bar 287 with its attached needle 284 to its unselected position and take the same out of operation, the solenoid 273 is energized which moves the notch 276 in the horizontal stop bar 268 beneath the pin 267 in the slide bar 263. If the needle mechanism is at rest when the solenoid 273 is energized, the position of the needle cam 232 is such that the slide bar 263 immediately drops to its lowermost position. If the needle mechanism is operating, the slide bar 263 will move to its extreme lowermost position on the completion of the cycle then in progress. In dropping to this position, the slide bar 263 rotates the shaft 281 and needle gear 283 sufficiently to bring the pin 321 in the needle gear into engagement with the right hand end of its associated recess 322 and move the previously operating needle bar 287 to the left where it is latched by the latch lever 297. The needle bar 287 of Fig. 15a is shown in such a position, and it will be noted that in this position the teeth of the needle gear 283 are disengaged from those of the rack 288 of the needle bar. Hence, when this particular needle gear 283 rotates in a counterclockwise direction in following cycles of operation of the needle mechanism, its associated needle bar 287 will not move to the left.

In the above description of the operation of a needle bar 287 performing stitching operations it was assumed that a single needle was operated at a time. In accordance with one of the features of the invention it is possible to simultaneously operate a plurality of needles so that duplicate designs may be embroidered and when different colored threads are employed in the needles the designs are worked with different colors. For example, the arrangement is such that if a duplicate design is to be made, one needle may stitch a part of the design with red yarn while another needle is stitching the same part of another design with green yarn. When it is desired to stitch with more than one needle in a cycle of operation of the needle mechanism, all that is necessary is for more than one of the trip magnets such as 301 to be energized to release more than one of the needle bars. The circuit controls whereby respective ones in certain groups of the needle bars are released constitute a feature of the invention and will be described hereinafter. For example, the circuit arrangements are such that with a total of ten needle bars the first and sixth needle bars may be released simultaneously, the second and the seventh, the third and the eighth, and so forth. The circuits are also arranged so that by the operation of certain switches the needles may be divided into groups of three each, and in such an arrangement the first, fourth and seventh, the second, fifth and eighth, or the third, sixth and ninth, needles may be released simultaneously. If in the latter case the needles all carry different colored yarns, three repetitions of the design would be embroidered simultaneously in a different combination of colors.

*Cutting the needle thread or yarn*

Obviously, when changing from one color yarn to another, or changing from one needle to another, it is necessary to cut the yarn of the needle or needles taken out of operation so as to prevent a tangle of yarns on the face of the fabric worked upon. In accordance with the invention the withdrawing of a needle from operation or the movement thereof to its unselected and latched position automatically operates a thread cutting device of the needle. In the preferred embodiment, the thread is cut close to the surface of the fabric worked upon so as to prevent a loose end of any length, and after the needle has nearly reached its extreme right hand position so as to have a sufficient length of the yarn through the eye of the needle to prevent it from being withdrawn therefrom the next time the needle is operated.

A thread or yarn cutting device is provided for each needle and needle bar 287 and each operates independently of one another. Referring to Figs. 15 and 15b, the thread cutting unit is associated with the left hand end of the needle bar 287 and is referred to generally by reference numeral 325. The unit includes a pair of side arms 326 connected together at their right hand end by a transverse section 327 and at their left hand ends by a transverse section 328. The left hand end of the needle bar 287 has a hole 329 drilled therein which contains a compression spring 331, the movable end of which works against a pin 332 extending between the two side arms 326 of the thread cutting unit. The left hand end of the needle bar 287 has recesses 333 formed on the sides thereof which are adapted to receive the ends of the arms 326 and permit sliding movement of the cutting unit relative to the needle bar.

When the needle bar 287 moves to the left to perform stitching operations, the left hand end of the thread cutting unit 325 presses against the fabric 292 and the spring 331 is compressed.

During movement of the needle bar to the right, the spring holds the cutting unit 325 in the position shown in Fig. 15, and during such operation there is no operative movement of the cutting unit. Thus during such stitching operations the pin 332 of the cutting unit merely slides back and forth in appropriate slots 334 in the left hand end of the needle bar.

The left hand end of the cutting unit 325 has upwardly extending fingers 335 between which the needle 284 and thread 308 are permitted to pass during normal stitching operations. Between the fingers 335 and just below the path of the needle 284 is a knife edge 336 secured in position by a screw 337. The knife edge slopes downwardly so as to have a better cutting action on the thread when operated, and in normal stitching operations, as shown in Fig. 15, the knife edge is located relatively close to the fabric worked upon. The lower ends of the fingers 335 of the cutting unit 325 carry a roller 338 in operative relation with a sloping surface 339, and the coaction between the roller and the surface 339 causes the cutting unit 325 to pivot at the desired times and sever the thread.

As will be recalled, when a needle and its associated needle bar 287 is taken out of operation or when returned to its normal latched position, it is moved toward the right a predetermined distance in addition to the normal rightward movement of a normal stitching operation. During this additional rightward movement of the needle bar, the pin 332 engages the left hand end of the slot 334 in the needle bar so that cutting unit 325 is moved with the needle bar. This movement of the cutting unit through the action of its roller 338 on the sloping surface 339 elevates the left hand end and brings the knife edge 337 into engagement with the yarn or thread whereby the same is cut. The cutting unit 325 is prevented from pivoting until the needle bar 287 is near its right hand position as the upper surface of the needle bar engages the upper surface of the arms 326 to prevent pivoting of the cutting unit until the pin 332 is at the left hand end of the slot 334. When the needle bar 287 is again released to begin stitching operations with the yarn carried by its associated needle, the movement of the needle bar from its extreme right hand or unselected position moves the cutting unit 325 a slight distance to the left, during which movement the right or left hand end is permitted to move downward and thereby withdraw the knife 337 out of the path of the needle 284. Thus the cutting unit 325 is brought into operation to cut the thread or yarn whenever a needle is taken out of operation or returned to its unselected position, and the cutting unit is restored to its non-cutting position in conjunction with the selection of the needle for operation. When the thread is cut, a pair of small discs, such as 340, located between the arms 326 of the cutting unit and urged together by springs (not shown) hold the loose end of the cut thread.

The shuttle operating mechanism

The shuttle operating mechanism 214 consists primarily of a set of selectively operable shuttle operating slide bars, each one of which has associated therewith a shuttle located on the opposite side of the fabric worked upon from the needles. A shuttle operating slide bar is selected and initiated into operation in much the same manner as a needle slide bar, such as 287, is selected. In a similar manner a shuttle operating slide bar is withdrawn from selective operation and returned to its normal unselected or latched position.

The power for operating the shuttle mechanism is derived from the shuttle cam 231 which, as set forth, is fixed to the shaft 226 and rotates with the needle cam 232. In operative relation with the periphery of the shuttle cam 231, Figs. 6 and 7, is a roller cam follower 341 adjacent the center of a lever 342. The lever 342 is pivoted at its right hand end on a shoulder screw 343 and has in its left hand end a slot 344 which engages a pin 346 in the lower end of a slide bar 347. The slide bar 347 has a spring 348 attached thereto which urges the same in an upward direction and normally keeps the roller cam follower 341 in engagement with the shuttle cam 231. The slide bar 347 has slots 349 through which extend guide pins 351 whereby the slide bar is guided in its up and down movement during rotation of the shuttle cam.

Pivotally attached to the upper end of the slide bar 347 is the lower end of a link 352, the upper end of which is attached to the right hand end of a rock lever 353. The rock lever 353 is pivotally mounted adjacent its center on a pin 354 supported in a bracket 356 mounted on the structural framework of the loom. Attached to the left hand end of the rock arm 353 is a second link 357 which has adjacent its lower end a slide bar 358 which is suitably guided for vertical movement in a guide block 359, Fig. 13, secured to one of the side plates 361 of the shuttle mechanism. The slide bar 358 has adjacent its lower end a rack 362, Fig. 6, the teeth of which engage those of a pinion 363 secured to a shaft 364 suitably journalled in bearings 366 mounted on the side plates 361.

From the above described structure it will be evident that as the shuttle cam 231 rotates, the slide bar 358 is moved up and down and it in turn, through the rack 362 and pinion 363, causes the shaft 364 to rotate, first in a clockwise direction, Fig. 6, as the bar moves up, and then in a counterclockwise direction as the bar moves down.

During a normal stitching operation the shuttle slide bar 358 is prevented from operating through a full stroke to its lowermost position by preventing the cam follower on lever 342 from engaging the depth of the shuttle cam 231. This is effected by a latch 367, Fig. 6, engaging a pin 368 on the lever 342. The latch 367 is operated by a solenoid 369 against the action of a spring 371, and when the solenoid is deenergized the spring 371 operates the latch to a position where the latching surface 372 thereof is engageable with the pin 368 to prevent the lever from operating to its extreme upper position and thereby prevents the shuttle slide bar 358 from moving to its extreme lower position. When a shuttle is to be taken out of operation, as more fully described hereinafter, the solenoid 369 is energized, whereupon the lever 342 is permitted to operate to its uppermost position and in so doing, the shuttle slide bar 358 is moved to its lowermost position.

Spaced along the shaft 364 and keyed thereto for rotation therewith are a plurality of shuttle gears such as 376, Fig. 14. There is a shuttle gear for each shuttle which in turn are equal in number to the needles, and in the present embodiment there are ten such gears. In operative relation with each of the shuttle gears 376 is an associated shuttle operating bar 377 which is guided for vertical movement in guide blocks 378. The guide blocks 378 are secured to units of the structural framework such as 216 and 216a by screws such as 379. Secured to the front of the guide blocks 378 by screws 381 are cover plates 382 which hold the bars 377 in position. Each shuttle operating bar has on the inner surface or right hand side, as shown in Fig. 14, a series of rack teeth 383 which co-operate in a manner hereinafter described with the teeth of an associated shuttle gear 376.

Individual springs 384 attached to the shuttle operating bars 377 urge the same in an upward direction. However, the bars are normally prevented from upward movement by reason of being latched in their normal or lower unselected positions. The latching is effected by a latch 386, one individual to each bar, engaging a latching surface 387 adjacent the lower end of the bar. The latches 386 are pivoted on shoulder screws such as 388 and are urged into latching positions by associated springs 389. In operative relation with the lower end of each latch 386 is a magnet 391 which when energized withdraws its associated latch from latching engagement with a shuttle operating bar 377 whereupon the attached spring 384 is effective to move the same a slight distance in an upward direction as controlled by the rotation of the shaft 364.

As more clearly shown in Fig. 14, each shuttle gear 376 has extending from the periphery thereof a pin 392 which co-operates with a flat surface 393 on the shuttle operating bar 377 to control the initial movement of the bar and to return the same to its unselected position whereby the associated shuttle is taken out of operation when desired.

Let it be assumed that the shuttle operating bar 377 of Fig. 14 is to be selected for operation in conjunction with its associated needle and the manner in which this is accomplished will now be described. Obviously, a shuttle operating bar, such as 377, is selected concomitantly with the selection of its associated needle operating bar and in conjunction with the energization of the magnet such as 301 for controlling the release of a needle bar 287, the magnet 391 is energized. For convenience these magnets of a needle bar and its associated shuttle bar may be wired in series or in parallel to operate simultaneously since it is normally necessary for a shuttle bar 377 to operate in conjunction with the operation of its associated needle bar. However, if desired, one or more of the needles may be employed to punch or form holes in the fabric and the edges of the holes embroidered, in which case such needles would be larger than the embroidering needles and would not have associated shuttles.

When a magnet 391 is energized and its latch 386 withdrawn from latching position, the rotation of the shaft 364 in a clockwise direction from the position shown in Fig. 14 moves the pin 392 extending from the rear in an upward direction and permits the associated shuttle bar 377, under the influence of its attached spring 384, to also move in an upward direction. After a small amount of movement of the bar, the teeth of the needle gear 376 engage those of the rack 383. Thereupon the shuttle operating bar 377 is coupled directly to the gear 376 and moves up and down in conjunction with the clockwise and counterclockwise rotation of the shaft 364. It is only the unlatched one or ones of the shuttle operating bars 377 that are permitted to move upward as their pins 392 rotate in a clockwise direction since the other bars 377 remain latched in their unselected positions.

The upper end of each shuttle operating bar 377 has pivotally connected thereto a link 394 which has pivotally attached to its upper end a shuttle carrier 396. The arrangement of the shuttle carrier 396 is best shown in Fig. 14 and the rightwardly extending arms thereof extend into a shuttle guide 397 wherein the shuttle 398 is located. A spring 395 coiled about the pivot screw for the link 394 tends to pivot the same in a clockwise direction to hold the carrier 396 against its guide 397. The shuttle guide 397 and shuttle 398 are of generally conventional construction with the guide 397 arranged to guide the shuttle in a path of movement which is slightly inclined from the vertical. The lower arm 399 of the shuttle carrier engages the bottom of the shuttle to elevate the same while the center arm 401 assists in guiding the shuttle in the carrier. The upper arm 402 of the carrier is pivoted at 403 and has an attached spring 404 which holds the arm against an adjustable stop 406. By pivoting the arm 402 counterclockwise from the position shown in Fig. 14, the shuttle 398 may be removed from the shuttle guide 397.

The shuttle cam 231, Fig. 6, is so arranged with respect to the needle cam 232 that it causes the upward movement of a shuttle 398 shortly after the needle has penetrated the fabric the maximum distance and withdrawn slightly whereby a loop in the yarn or thread is formed on the back of the fabric through which the shuttle passes. After the shuttle 398 is elevated the needle 284 is withdrawn from the fabric and the shuttle thread locks the needle thread in the fabric, following which the shuttle is lowered to its lower operating position.

During consecutive stitching operations by the same needle the shuttle operating bar 377 is not returned to its extreme lower position in conjunction with each stitch but to a position slightly above its extreme lower position. To prevent the shuttle operating mechanism from lowering the selected shuttle operating bar 377 to its extreme lower position, the solenoid operated latch 367 is so positioned as to engage the pin 368. Thus the cam follower 341 of the shuttle operating mechanism is prevented from moving to the extreme depth of the shuttle cam 231 and the operating shuttle bar 377 will not be lowered sufficiently for it to engage its latch 386 or to move the teeth of the rack 383 out of engagement with those of the shuttle gear 376. When it is desired to take a shuttle out of operation, as when the color of the yarn being worked is changed by employing another needle, the solenoid 369 is energized whereupon the cam follower 341 moves to the extreme depth of the shuttle cam if the cam is at rest or, if rotating, when it completes the revolution in progress. This effects through the described mechanism rotation of the shaft 364 sufficiently for the pin 392 to engage the surface 393 of the unlatched or selected shuttle operating bar 377 and move the same to its extreme lower position where the latch 386 engages the surface 387 to latch it in its normal position. Thus in conjunction with the operation of magnet 391 and solenoid 369, a shuttle operating bar 377 or a shuttle 398 is selected for operation during following cycles of operation of the mechanism and is taken out of operation when it is desired to do so.

While the operation of the shuttle mechanism has herein been described in conjunction with the operation of but a single shuttle operating bar 377, it will be obvious that the energization of more than one magnet, such as 391, of which there is one for each shuttle operating bar, will condition the shuttle mechanism for the simultaneous operation of a corresponding number of shuttles at a time. The operation of more than one shuttle and needle set at a time enables, as set forth, the working of a plurality of similar designs simultaneously.

*Cutting shuttle thread*

Inasmuch as any one or more of the ten shuttles can be employed at a time and different shuttles are used when changing from one needle to another, it is desirable to cut the shuttle thread when one or more are taken out of operation. This prevents tangling of threads on the back side of the fabric. In the preferred embodiment the shuttle thread is automatically cut when a shuttle is taken out of operation or lowered to its lowermost or unselected position.

Referring now to Figs. 13, 14 and 14b, each of the shuttle guide members 397 has secured to the right hand face thereof or the side next to the fabric worked upon, a plate 411 which assists in guiding the shuttle 398 and which has adjacent its center an offset section 412. The offset portion 412 has a hole therein to permit passage of the needle therethrough and in the cavity formed by the offset portion and the guide 397 is a thread shearing plate 413. There is a thread shearing plate 413 individual to each shuttle and each has a hole such as 414 which lines up at the desired time with the hole 416 in the plate 411 to permit passage of the needle through both. When a shuttle is taken out of operation, the plate 413 is moved so as to produce a shearing action between its hole 414 and hole 416 in the plate 411 and thereby cut the shuttle thread 308' which may be extending through these holes.

When a shuttle together with its operating elements is selected for operation, the first part of its movement from its lowermost position or the movement thereof from its lowermost position to the position to which it is returned between successive cycles of operation, elevates the shuttle carrier 396 sufficiently to move a cam surface such as 417 out of operative relation with the arm 418 of a bell crank indicated generally by reference numeral 419. The bell crank 419 thereupon, under the influence of a small spring 421, rocks a slight amount in a counterclockwise direction as viewed in Fig. 13 to bring the arm 418 against a stop 422. The opposite end of the bell crank 419 has an upwardly extending arm 423, the upper end of which engages a slot in the thread shearing plate 413 and during the counterclockwise movement of the bell crank 419 the plate 413 is slid to the left whereupon its hole 414 lines up with the hole 416 in the plate 411. Thus the holes 414 and 416 are lined up to permit passage of the needle into operative relation with the shuttle 398 to permit the shuttle and needle threads to lock.

The thread shearing plate 413 remains in the position with its hole 414 lined up with the hole 416 during all subsequent continuous operations of its associated shuttle since during such operation the shuttle carrier 396 is not lowered sufficiently to bring the cam surface 417 into operative relation with the end of the arm 418 of the bell crank 419. However, when a shuttle is taken out of operation which, as described, includes the movement of the shuttle carrier from an intermediate lower position to its extreme lower position, it permits the cam surface 417 to engage the arm 418 of the bell crank and rock the latter in a clockwise direction as shown in Fig. 13. Such rocking of the bell crank 419 through its arm 423 slides the shearing plate 413 to the right whereupon a shearing action between its hole 414 and the hole 416 in the plate 411 shears the shuttle thread. Thus the shuttle thread 308' is cut whenever a shuttle is taken out of operation and the frame holding the fabric may move relative thereto without being impeded by trailing shuttle threads or without pulling of the threads from the shuttles.

*Electrical control circuits*

The various functions of the loom including the selection of one or more of the needles and associated shuttle or shuttles for operation, the movements of the frames, and release of the clutches of the needle and shuttle operating mechanism are all remotely controlled. In this manner the hereinafter described electrical control equipment can be remote from the loom and in a more accessible and cleaner or dust-free location, as all that is necessary between the control equipment and the loom are a relatively few electrical conductors. By multiplying the electrical conductors through well known arrangements of relays, several looms can be controlled simultaneously from a single electrical control circuit.

Referring now to Figs. 32 and 33 which show a preferred arrangement of the electrical control circuits, a tape transmitter is indicated at 426 which may be of the type well known in the telegraph art, as for example, the type disclosed in the patent to Benjamin, No. 1,298,440, granted March 25, 1919. Transmitters of this type contain a set of sensing pins, usually five in number, which are periodically elevated to sense transverse sections in a control tape. Each transverse section of the control tape indicated by reference numeral 427 represents a group of code impulses, and the transmitter senses these perforations to establish corresponding control circuits. The transmitter includes a set of five electrical contact making tongues 428 operated by the sensing fingers to contact either the marking M or spacing S bus bar depending upon whether the respective sensing finger senses a hole in the tape or a non-perforated section, respectively.

In accordance with the invention, the tape 427 for controlling the transmitter 426 may be similar to that employed to store telegraph signals wherein each transverse section represents a coded group of five impulses. The tape 427 may be prepared, for example, by a so-called keyboard perforator 429 which consists of a plurality of key levers arranged in a manner similar to those of a typewriter and when operated produce a representative perforation in the tape. Such keyboard perforators are well known in the telegraph art and the tape is advanced through the keyboard perforator in conjunction with the actuation of a key lever.

Co-operating with the transmitter 426 is the distributor represented by the dotted rectangle 431. The distributor includes a set of five segmented rings A, B, C, D and E, shown developed in the drawings, with a co-operating brush arm 432. The brush arm 432 is frictionally driven, has an upper and a lower section electrically separated, and may be stopped in a predetermined rest position by a latch 433. The latch 433 is operated by a magnet 434 and a spring 436. When the magnet 434 is energized, the latch is positioned to stop the brush arm 432 at the completion of its current revolution, and when the magnet is released the spring 436 operates the latch to release the brush arm. The brush arm 432 thereupon rotates continuously until stopped by re-energization of the magnet.

The circuit to the magnet 434 is controlled by a start key 437 and tape lever operated contacts 438. The latter contacts are operated by a tape lever 439 having an arm riding on the loop of tape between the keyboard and the transmitter. The contacts 438 are opened when the tape becomes taut and close when a supply of tape accumulates between the keyboard 429 and the transmitter 426.

The five tongues 428 of the transmitter are connected by individual conductors to the front contacts of a so-called frame control relay 441 in parallel with front contacts of a so-called needle control relay 442. The tongues of relay 441 are connected over individual conductors through the coils of four so-called frame movement selecting relays 443, 444, 445 and 446, and a rub-out relay 447 to potential. In a similar manner the five tongues of relay 442 are connected by individual conductors through the coils of five needle selecting relays 448a, 448b, 448c, 448d and 448e to potential.

The frame movement relays 443 to 446 in a manner hereinafter described control the movement of the inner and outer frames while the needle selecting relays 448a to 448e control various selective operations including the selection of the various needles. In the preferred embodiment of the invention, each cycle of operation of the loom is jointly controlled by a pair of consecutive perforated transverse sections in the control tape 427. Normally the first code group of a pair determines the movement of one or both of the frames and the second group of the pair determines the needle or needles operated. Other functions of the loom are controlled by predetermined code groups in a manner hereinafter pointed out.

Let it be assumed that the first code group of a pair of perforations in the tape 427 is being sensed by the transmitter and the tongues 428 are accordingly positioned, that the start key 437 is closed to energize the magnet 434, that the tape lever contacts 438 are also closed, and that a supply of tape is available for the transmitter. As the magnet 434 operates, the brush arm 432 is released and shortly after it begins rotating a circuit is completed from potential at ring D, through the lower part of the brush and segments 2, 3, 4 and 5 of ring E and the coil of relay 441 to ground. This circut operates relay 441 which extends the circuits of the tongues of the transmitter through the coils of relays 443 to 447 whereupon said relays are operated in accordance with the positions of the tongues 428. Shortly thereafter the upper section of the brush arm contacts segment 1 of ring A and applies potential from ring B over conductor 449 to the back contact of relay 447. If relay 447 is one of the relays not operated, this potential is extended to the tongues of relays 443 to 446 and through front contacts of the operated ones of these relays to corresponding frame movement control magnets such as 151, 151a, 151b and 151c. The latter magnets are included in the above described clutch control units where, for example, magnet 151 in unit 92 when operated may produce upward movement of the inner frame and magnet 151a downward movement of the frame during cycles of operation of the associated unit. Similarly the magnets 151b and 151c may be located in the clutch control unit 58 for moving the horizontal frame, one magnet such as 151b being operated when the frame moves in one direction, such as to the right, and the other magnet 151c being energized when the frame is to move to the left. A frame movement magnet 151 of each clutch control unit may be energized simultaneously to produce a resultant diagonal movement of the inner frame and for such movements all that is necessary is for the desired ones of the relays 443 to 446 to be energized.

As the lower part of the brush leaves the No. 5 segment of ring E, relay 441 releases and shortly thereafter the brush contacts segment No. 7 and completes a circuit through the coil of the step magnet SM of the transmitter to ground. The step magnet thereupon is operated and advances the next or second perforation of the first pair into association with the sensing pins of the transmitter whereupon the tongues 428 are positioned in accordance with the needle selecting code of the first pair of code impulses. Following this operation the lower brush completes a circuit for the operation of relay 442 which extends the circuits from the tongues of the transmitter through respective coils of the needle selecting relays 448 to potential. Thus the needle selecting relays 448 are operated in a permuted setting representative of the second or needle selecting code.

The tongues and contacts of the needle selecting relays 448 are arranged in what is known as a fan circuit whereby, depending upon the operated and non-operated condition of these relays, a circuit is established to a representative one of a plurality of contacts of the last one of these relays such as 448e. Soon after the operation of one or more of the relays 448, the upper brush completes a circuit from ring B over conductor 451 to the tongue of the first needle selecting relay 448e, and depending upon the operation of these relays, this circuit is extended to any one of the front or back contacts of relay 448e. For convenience these contacts are numbered 1 to 16. The first three of these contacts extend to the movable arms of a switch 452, the next three to the movable arms of a switch 453, the third group of three to the movable arms of a switch 454, and the tenth through the coil of a shuttle release magnet 391j in parallel with a needle release magnet 301j, conductor 455, the arm and left hand contact of a switch 456 and a resistance 457 to ground. The left hand contacts of switch 452 extend through the coils of needle release magnets 301a, 301b and 301c to conductor 455 and each of these is in parallel with associated shuttle release magnets such as 391, the latter magnets being omitted from the drawings for the sake of simplicity. The left hand contacts of switch 453 extend to the left hand contacts of a switch 458, the arms of which are connected through coils of three other ones of the needle release magnets 301. In a similar manner the left hand contacts of switch 454 are connected through left hand contacts of a switch 459 to three of the needle release magnets 301. It will be understood that each of the needle release magnets 301a to 301j have in parallel association therewith a shuttle release magnet 391a to 391j and whenever a circuit is completed for the operation of a needle release magnet, the shuttle release magnet 391 also operates.

Let it be assumed that the switches 452, 453, 454, 458 and 459 are in their left hand positions, as shown; that the brush arm 432 is released by energization of the trip magnet 434; and that in conjunction with the first revolution of the brush arm 432 a first code group consisting of marking, spacing, spacing, spacing and spacing impulses and a second code group consisting of marking, marking, marking, spacing and marking impulses are sensed by the transmitter 426. The first code group effects energization of only relay 443 which in turn causes magnet 151 to be operated and in accordance with previous assumptions the operation of the magnet causes the inner frame to be elevated during the representative cycle of operation of the loom. Similarly, code groups causing either magnets 151a, 151b or 151c to be energized would produce corresponding movements of the inner or outer frames, or both frames could be moved substantially simultaneously by code groups causing a magnet of either pair to be energized.

The sensing of the second one of the assumed code groups and the energization of relay 442 establishes circuits for the energization of needle selecting relays 448a, 448b, 448c and 448e. With these relays energized a circuit is completed through the tongues and contacts thereof to the No. 3 contact of relay 448e and when the brush arm subsequently contacts segment No. 2 of the A ring, potential is applied to the circuit which, as described, extends to the needle selecting magnet 301c. Accordingly the associated needle is selected for operation and in timed relation therewith the brush arm completes a circuit for the energization of the clutch magnet 256 of the needle and shuttle operating cam shaft to subsequently operate the needle and its associated shuttle through a stitching cycle. Near the end of the revolution of the brush arm 432 it contacts segment No. 14 of ring D, completing a circuit for again operating the transmitter step magnet SM to advance the first code of the next pair into operative relation with the sensing pins.

A needle and shuttle after being selected are maintained in a selected condition and operated during following successive cycles of operation of the needle and shuttle mechanism or until the same is taken out of operation in response to the sensing of what may be termed a cut-off code group which in addition to taking a needle and shuttle out of operation causes, as described, the needle and shuttle thread to be cut. The cut-off code group is transmitted instead of a needle selecting code as the second one of each pair. In the arrangement shown the cut-off code group causes relays 448a to 448e to be operated in a combination to establish a circuit to the No. 11 contact of relay 448e, which contact extends through the coils of solenoids 273 and 369 to ground. Accordingly, as the brush contacts the No. 2 segment of ring A for this code, these solenoids are energized and in the manner set forth cause the previously selected needle and shuttle bars to be returned to their normal latched position and their threads cut, and during the accompanying cycle of operation of the needle and clutch mechanisms no stitching operation is performed.

After a needle is selected by the operation of its representative needle selecting magnet 301, the same selecting code group is normally transmitted in conjunction with each following pair of codes, although any code group which does not perform a needle selection function or effect operation of one of the magnets 301 can be transmitted and the previously selected needle will be operated during all following cycles of operation of the loom. In other words, a needle after being selected by the operation of its respective magnet 301 is retained in a selected and operative condition until a cut-off code is transmitted. Obviously, with this arrangement other of the needles may be selected, one at a time, in response to respective codes to operate simultaneously with the first selected needle. In this way any one of the desired needles may be added at any time to the selectively conditioned needles to operate simultaneously therewith.

As will be noted, contacts 13 to 16 of relay 448e extend over associated conductors through the coils of magnets 201, 202, 201a and 202a to ground, and accordingly, operation of the relays 448 to 448e, in certain combinations, establish circuits for the operation of any one of these magnets during a cycle of operation of the distributor. Each pair of magnets or solenoids 201 and 202 are included in a clutch control unit such as 92 and the energization thereof, as described, determines whether the associated frame is to move one or two increments in the accompanying cycle of operation. By the energization of one or the other of the solenoids 201 and 202 of a pair, one frame may be adapted to move one increment and the other two increments, or any combination of these movements. The magnets 201 and 202 may be energized selectively prior to the selection of a needle or after one or more needles have been selected and operated through a desired number of cycles.

If at times it is desirous to prevent operation of both of the frames during a cycle of operation of the loom, a code group having the third pulse thereof marking, is transmitted instead of the usual frame movement determining code. The transmission of such a code from the transmitter 426 causes relay 447 to be energized which thereby opens the circuit to the tongues of the frame movement relays 443 to 446, and for the accompanying cycle of operation none of the frame movement magnets 151 can be operated.

As will be noted in the drawings, most of the various magnets and solenoids of the controlling units of the loom have in parallel association therewith a neon lamp, such as 461, which will be lighted whenever a circuit is completed to its respective magnet or solenoid. With this arrangement a visual indication is provided each time a circuit is completed to a particular magnet or solenoid or, as in the case of the needle selecting magnets 301, to indicate when such magnets are operated. This facilitates a more convenient checking and servicing of the various operations of the loom and the control circuits therefor.

With the various manually operable switches of Fig. 33 in the positions shown, circuits are established for the selection and operation of any one at a time of the ten needle selecting or release magnets 301a to 301j in response to representative needle selecting codes. However, it may be advantageous at times to select a plurality of needles simultaneously in response to but a single needle selecting code group. By operating the switch 458 to its right hand position, circuits are established for simultaneously operating needle release magnets 301a with 301d and 301b with 301e, and 301c with 301f. Thus a pair of needles are selected in response to a single predetermined needle selecting code which normally effects selection of but a single needle. By operating switch 459 to its right hand position, needle release magnets 301g, h and i may be added to the group and either one of these operated simultaneously with the operation of the previously mentioned ones. The switch 456 cuts compensating resistances, such as 457, into the needle release magnet circuits and is operated in conjunction with the operation of switches 458 and 459. By making it possible to select one, two or three needles in response to a single code, duplicate designs may be stitched on the fabric simultaneously, and if these needles carry different colored threads, the designs will be worked in different color combinations.

The various ones of the needles are separated and obviously when it is desired to continue the stitching line with a different colored thread, it is necessary to move the fabric horizontally to bring the last stitched point opposite the next needle to be operated, and this is accomplished by transmitting the necessary number of horizontal frame movement codes to the loom.

In the preferred embodiment, the outer frame 29 operates one or the other of a pair of limit switches 471 and 472, Fig. 3, when moving to its extreme positions. Similarly, the inner frame 68 operates one or the other of a pair of limit switches 473 and 474 when elevated or lowered to its extreme positions. These switches may close circuits to operate lamps to inform the attendant of the prevailing condition of the loom. The limit switches may also open the circuits of the frame movement controlling magnets such as 151, or relays 443 to 446, to prevent further movement of the frames in any particular direction although such frame movement code continue to be transmitted. With this arrangement the operation of the loom into stitching cycles can be initiated from a unison position. For example, the normal needle selecting and frame movement codes can be preceded by a sufficient number of frame movement codes to insure that the frames are in either one of their extreme positions.

Figure 34:
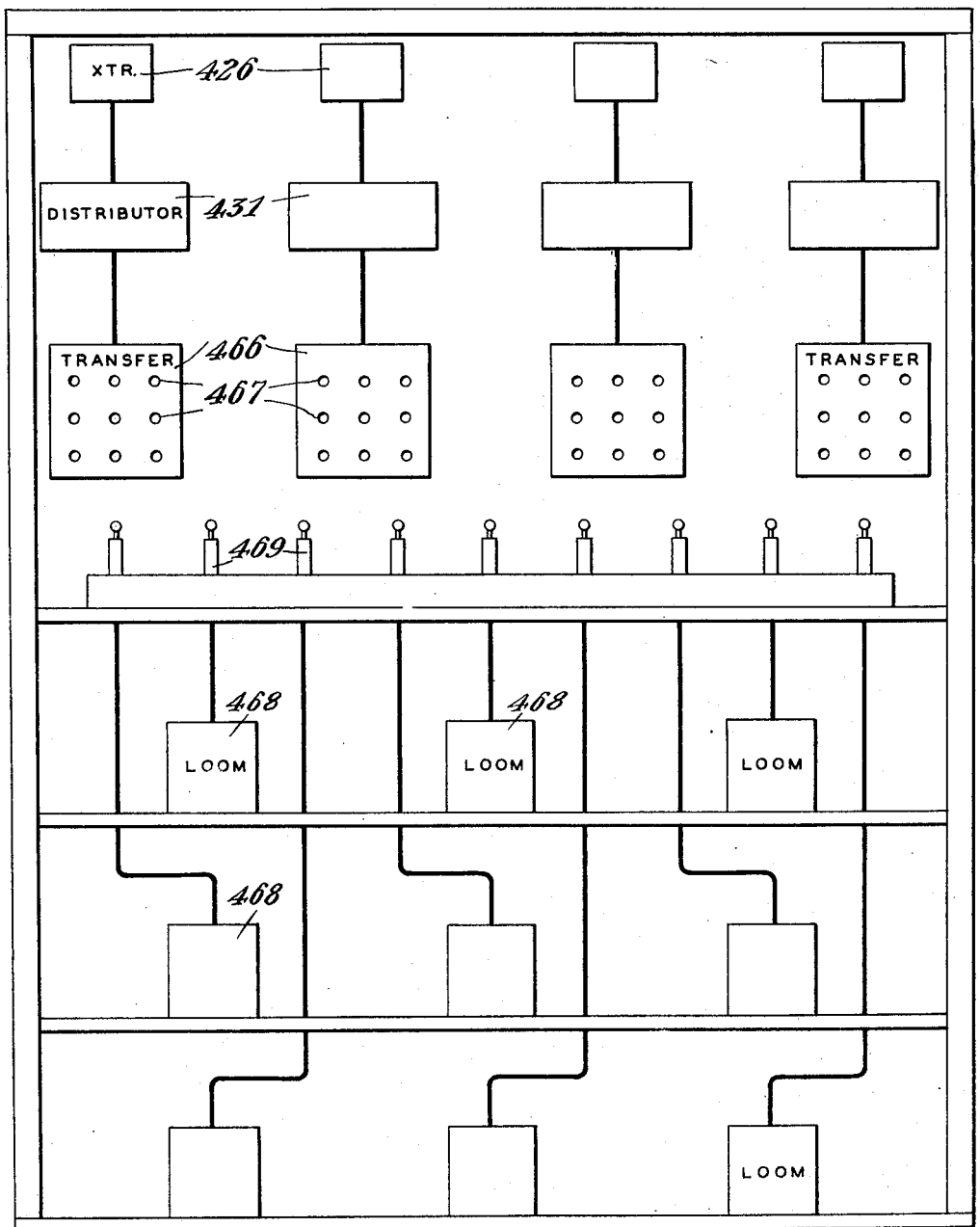
Fig. 34 is a diagrammatic representation of the manner in which a single control unit may be employed to control a plurality of machines located remotely therefrom as for example on various floors of a building.

Fig. 34 illustrates the arrangement of a plurality of looms located on different floors of a factory with the control units therefor on another floor such as the top. Here four transmitters such as 426 are shown with associated distributors 431, and each transmitter may be controlled by a tape representing a different textile design. The distributors 431 terminate in so-called transfer boards 466 having a plurality of jacks 467. The control circuits to each loom, represented generally by reference numeral 468, Fig. 45, terminate in individual plugs such as 469 in the control room, and by inserting these plugs in appropriate jacks 467 of the transfer boards, any of the looms may be adapted to operate under the control of any one of the transmitters such as 426.

It will be obvious that various modifications of the embodiment of the loom and control circuits therefor described and shown in the accompanying drawings will be apparent to those skilled in the art, and it is desired, therefore, that only such limitations be placed on the invention disclosed herein as are imposed by the appended claims.

What is claimed is:

1. In a textile machine of the type described, a plurality of embroidery needles capable of operation one or more at a time, a first frame movable to and fro, a second frame carried by said first frame and movable up and down, a fabric to be embroidered carried by said second frame in front of said needles, a perforated control tape having transverse sections thereof perforated in accordance with a predetermined plan to represent a design to be embroidered on said fabric, said perforations being arranged in pairs in consecutive transverse sections in said tape, means for electrically sensing one transverse section of said tape at a time, a plurality of electroresponsive devices, means controlled by said sensing means in conjunction with the sensing of pairs of consecutive perforated transverse sections of said tape to establish electrical circuits in accordance therewith and operate selected ones of said electroresponsive devices in said established circuits to control movements of said frames and for selectively controlling operation of one or more of said needles at a time.

2. In a textile machine, a plurality of embroidery needles capable of operation one or more at a time, a perforated tape having predetermined transverse sections thereof representing in accordance with a predetermined plan various individual ones of said needles, means for sensing one transverse section of said tape at a time, means controlled by said sensing means for selecting said needles for operation in accordance with said needle representing section of said tape, said last mentioned means including electrical circuits and electromagnetically operable devices, means for operating the selected needles, and manually operable means for adapting said sensing means to select a plurality of said needles for simultaneous operation for each of said individual needle representing transverse sections in said tape which normally cause operation of a single needle.

3. In a textile machine, a plurality of embroidery needles, a tape having permutations of perforated and non-perforated areas in each transverse section thereof with different permutations representing different needles, a translating mechanism controlled by said tape and including means for electrically sensing the perforations therein, a needle operating mechanism, an electroresponsive device for each needle, means including said translating mechanism as controlled by said tape for selecting one of said electroresponsive devices at a time and means controlled by said selected electroresponsive device for conditioning the respective needle for operation by said needle operating mechanism.

4. In a textile machine, a plurality of embroidery needles, a tape having permutations of perforated and non-perforated areas in each transverse section thereof with different permutations representing different needles, a translating mechanism controlled by said tape and including means for sensing the perforations therein, a needle operating mechanism, means including said translating mechanism as controlled by said tape for normally selecting one of said needles at a time for operation by said needle operating mechanism, and manually operable electrical circuit controlling means for conditioning the translating mechanism to select a plurality of said needles for operation in response to the sensing of predetermined of said permutations.

5. In a textile machine of the type described, a first frame movable in one path, a second frame carried by said first frame and movable in a path at right angles to the path of movement of said first frame, a fabric carried by said second frame, a plurality of individually operable embroidery needles, a tape having successive transverse sections thereof perforated to represent permutation code groups, separate operating means for each of said frames, needle operating means, a tape sensing means for establishing electrical circuits in accordance with perforations in said tape, means including said sensing means as controlled by alternate code groups in said tape for controlling said frame operating means, and means including said sensing means as controlled by the others of said code groups for selecting said needles for operation by said needle operating means whereby the various ones of said needles are operative on the various areas of said fabric.

6. In a textile machine of the type described, a fabric carrying frame movable in a predetermined path, a frame moving means, a tape having code groups perforated therein with corresponding ones of each series of a plurality of code groups representing in accordance with a predetermined plan a frame movement, means for sensing said code groups one at a time, electrical means including electroresponsive devices controlled by said sensing means on the sensing of a predetermined frame movement code group to control said frame moving means to move said frame a predetermined distance, and electrical means including other electroresponsive devices controlled by another predetermined code group to condition said frame moving means to move said frame a different distance when sensing following frame movement code groups.

7. In textile loom control system, a loom having a pair of frames, one within the other and movable in a common plane in directions substantially at right angles, a fabric carried by one of said frames, a plurality of needles on one side of said fabric and corresponding shuttles on the other, a pair of feed screws and associated followers associated with said frames; a control mechanism for selectively controlling rotation of said feed screws to produce movements of said frames and for selecting needles with associated shuttles for operation, a storage medium having permuted codes stored therein representing according to a predetermined plan a design to be stitched in said fabric, means for sensing said medium and establishing corresponding electrical circuits and means including a pair of consecutive stored codes in said medium for operating said sensing means and control mechanism to selectively move one or both of said frames and select one of said needles for a stitching operation through said fabric.

8. In textile loom control system, a loom having a pair of frames, one within the other and movable in a common plane in directions substantially at right angles, a fabric carried by one of said frames, a plurality of needles on one side of said fabric and corresponding shuttles on the other, a tape having coded perforations therein representing according to a predetermined plan a design to be stitched on said fabric, frame moving means including a separate lead screw for each frame a common operating means for said needles and shuttles to produce stitching operations, a translating means including electromagnetic devices, and means including the electromagnetic devices of said translating means as controlled by said tape to operate said frame moving means to selectively rotate said screws and select desired ones of said needles and shuttles for operation by said needle and shuttle operating means whereby the design represented by said coded perforations is stitched on said fabric.

9. In textile loom control system, a loom having a pair of frames, one within the other and movable in a common plane in directions substantially at right angles, a fabric carried by one of said frames, a plurality of needles on one side of said fabric and corresponding shuttles on the other, a tape having coded perforations therein representing according to a predetermined plan a design to be stitched on said fabric, said perforations being arranged in pairs with one of each pair representing frame movements and the other needle selections, needle operating means, means for individually sensing said codes one code group of each pair at a time, and means controlled by said sensing means in sensing each pair of perforations to move said frames in accordance with the frame code and select one of said needles for operation by said needle operating means whereby the design represented by said perforations is stitched on said fabric.

10. In textile loom control system, a loom having a pair of frames, one within the other and movable in a common plane in directions substantially at right angles, a fabric carried by one of said frames, a plurality of needles on one side of said fabric and corresponding shuttles on the other, a tape having coded perforations therein representing according to a predetermined plan a design to be stitched on said fabric, said perforations being arranged in pairs with one of each pair representing frame movements, frame moving means, tape sensing means, means including said sensing means as controlled by predetermined of said frame movement representing codes to control said moving means to move said frames a predetermined increment, and means including said sensing means as controlled by one or the other of a pair of predetermined conditioning codes to condition said frame moving means to move said frames another increment in response to the same frame movement representing codes, said last mentioned means including a pair of electroresponsive devices responding to said predetermined conditioning codes.

11. In textile loom control system, a loom having a pair of frames, one within the other and movable in a common plane in directions substantially at right angles, a fabric carried by one of said frames, a plurality of needles on one side of said fabric and corresponding shuttles on the other, a tape having coded perforations therein representing according to a predetermined plan a design to be stitched on said fabric, a transmitter controlled by said tape for establishing electrical circuits in accordance with said perforated codes, electromagnets selectively operated by said electrical circuits, and means controlled by said magnets for controlling movements of the frames of said loom and for selecting one of said needles for operation at a time whereby the design represented by said perforations is stitched on said fabric.

12. In a textile loom of the type described, a plurality of stitching needles, a fabric carrying frame, a first electrically operated means for moving said frame to place any elementary area of said fabric in stitching position with respect to any one of said needles at a time, a second electrically operated means for operating any one of said needles in a stitching operation, a tape having codes perforated therein to represent according to a predetermined plan a design to be stitched on said fabric, each of said codes being in a separate transverse section of said tape and arranged in pairs with one code of each pair representing an operation of said first electrically operated means and the other of said pair representing an operation of said second electrically operated means, a transmitter for sensing the perforations in said tape, one code at a time, and means including said transmitter as controlled by consecutive pairs of transverse sections of said tape for alternately controlling said first and second electrically operated means to stitch said design on said fabric.

13. In a textile loom of the type described, a plurality of stitching needles, a fabric carrying frame, a first electrically operated means for moving said frame to place any elementary area of said fabric in stitching position with respect to any one of said needles, a second electrically operated means for operating any one of said needles in a stitching operation, a tape having codes perforated therein to represent according to a predetermined plan a design to be stitched on said fabric, said codes being in pairs with one of each pair representing an operation of said first electrically operated means and the other of the pair an operation of said second electrically operated means, means for sensing said perforations one code at a time and means including said tape for alternately controlling said first and second electrically operated means to stitch the design represented by said tape on said fabric.

14. In an electrical control system for textile machines, said control system including a tape having coded perforations thereon, a transmitter into which said tape is fed, said transmitter having electrical contacting means for transmitting electrical coded impulse combinations as directed by the perforations on said tape as said tape is moved through said transmitter, a distributor associated with said transmitter, a textile machine having two groups of magnets for controlling selective operation thereof, means including said distributor for directing the coded impulses from said transmitter to one of said groups of magnets at a time and thereby cause the energization of one or more of said magnets, and means including the selection of one or more of said magnets for controlling the sequence of operations of said machine to form designs in a fabric in accordance with the coded perforations on the tape.

15. In a textile machine, an electrical control means therefor, said electrical control means being separated from said textile machine and associated therewith through the medium of electrical wiring for transmitting electrical impulses from said control means to said textile machine, said control means including transmitting means for alternately transmitting electrical coded impulses through said wiring to a plurality of groups of electromagnet means in said textile machine, one group at a time, said coded impulse combinations selecting one or more electromagnet means from one of said groups of electromagnet means at a time, said selected magnets controlling the sequence of operations of said machine for the formation of designs in a fabric in accord with the electrical coded impulses originated in and conducted from said control means through the medium of the electrical wiring.

16. In a textile machine, a control means therefor, said control means physically separated from said textile machine but associated therewith through the medium of electric wiring means, said textile machine being either an embroidery machine to produce embroidered designs upon a fabric, or a weaving machine for weaving a fabric; said control means including a tape with perforations thereon; a transmitter into which said tape is fed, said transmitter transmitting electrical pulses in coded combinations as directed by the perforations on said tape one combination at a time; timing distributor means; relay control means into which said coded electrical pulses are selectively transmitted; a plurality of groups of electromagnetic means in said embroidery machine or said weaving machine selectively responsive to said coded electrical pulses whereby the sequence of operation of said embroidery machine or said weaving machine is controlled and directed through the medium of the coded perforations on the perforated tape and means including said distributor for directing the electrical coded combinations to said groups of electromagnetic means in sequence and one combination at a time.

17. In a textile machine, a plurality of embroidery needles capable of operating one or more at a time, a perforated tape, means for sensing said tape and establishing electrical circuits in accordance with the perforations therein, electroresponsive devices controlled by said circuits, said devices normally being operated one at a time and causing operation of one of said needles at a time on a sensing operation, manually operable switching means associated with said electrical circuits and means including said switching means for adapting said sensing means to cause the simultaneous operation of a plurality of said electroresponsive devices and needles at a time.

18. In an electrical control means for textile machines, said control being applicable to either an embroidery machine or to a machine for weaving fabrics, said control means including a tape having coded perforations thereon, means for sensing said perforated tape, said means having electrical contacts therein, said contacts being operated one code at a time as directed by the perforations in a transverse section in said tape, distributor means associated with said sensing means and operating in timed relation therewith, a plurality of groups of electroresponsive magnets, relay control means controlled by said distributor for alternately operating one or more magnets in a group at a time, and means controlled by the sequential selection of magnets from said groups for controlling the sequence of operations of said machine for the formation of designs in a fabric in accordance with the coded perforations on said tape.

LOUIS CASPER.

References Cited in the file of this patent

UNITED STATES PATENTS

| Number | Name | Date |
|---|---|---|
| 247,944 | Nida | Oct. 4, 1881 |
| 377,408 | Smith | Feb. 7, 1888 |
| 579,614 | Steward et al. | Mar. 30, 1897 |
| 714,129 | Bastie et al. | Nov. 25, 1902 |
| 979,964 | Knecht | Dec. 27, 1910 |
| 1,344,611 | Bersin et al. | June 29, 1920 |
| 2,336,910 | Zenner | Dec. 14, 1943 |
| 2,358,375 | Bacon et al. | Sept. 19, 1944 |